United States Patent
Hirai et al.

(10) Patent No.: US 7,571,582 B2
(45) Date of Patent: Aug. 11, 2009

(54) VACUUM HEAT INSULATOR, METHOD OF MANUFACTURING THE SAME, AND REFRIGERATOR USING THE SAME

(75) Inventors: Yoshihide Hirai, Otsu (JP); Chie Hirai, Otsu (JP); Yasuaki Tanimoto, Nishinomiya (JP); Keisuke Tsunetsugu, Mino (JP); Hiroto Nakama, Tondabayashi (JP); Yukako Akeyama, Ikoma (JP)

(73) Assignee: Panasonic Corporation, Osaka (JP)

( * ) Notice: Subject to any disclaimer, the term of this patent is extended or adjusted under 35 U.S.C. 154(b) by 980 days.

(21) Appl. No.: 10/514,809

(22) PCT Filed: Jun. 2, 2003

(86) PCT No.: PCT/JP03/06915

§ 371 (c)(1),
(2), (4) Date: Nov. 17, 2004

(87) PCT Pub. No.: WO03/102460

PCT Pub. Date: Dec. 11, 2003

(65) Prior Publication Data

US 2005/0175809 A1    Aug. 11, 2005

(30) Foreign Application Priority Data

| May 31, 2002 | (JP) | 2002-160656 |
| Jun. 5, 2002 | (JP) | 2002-163954 |
| Jun. 5, 2002 | (JP) | 2002-163956 |
| Jun. 5, 2002 | (JP) | 2002-163957 |
| Jun. 6, 2002 | (JP) | 2002-165814 |
| Jul. 1, 2002 | (JP) | 2002-192615 |

(51) Int. Cl.
*E04C 2/54* (2006.01)
*B32B 1/04* (2006.01)
*B32B 3/02* (2006.01)

(52) U.S. Cl. .................... 52/784.15; 428/69
(58) Field of Classification Search .................. 428/69, 428/74, 76; 52/784.15
See application file for complete search history.

(56) References Cited

U.S. PATENT DOCUMENTS 4,726,974 A * 2/1988 Nowobilski et al. ........... 428/69

(Continued)

FOREIGN PATENT DOCUMENTS

JP          51-147577          12/1976

(Continued)

*Primary Examiner*—Richard E Chilcot, Jr.
*Assistant Examiner*—Mark R Wendell
(74) *Attorney, Agent, or Firm*—Steptoe & Johnson LLP

(57) ABSTRACT

A vacuum heat insulator according to the present invention includes a core molded to be plate-shaped with the use of a binding agent. The vacuum heat insulator assumes any one of the following configurations. A) The core is formed by curing a fiber aggregate by means of a binding agent. The fibers have an average fiber diameter of at least 0.1 µm but at most 10 µm, and voids defined by fibers have a void diameter of at most 40 µm. The core has a percentage of the voids of at least 80%. B) The binding agent is varied in concentration in a through-thickness direction of the core. C) A cured layer solidified by the binding agent is formed on at least one side surface of the core. D) The core contains fibers having a length of at most 100 µm. The fibers are oriented perpendicular to a direction of heat transmission. Such vacuum heat insulator is excellent in adiabatic property. Refrigerators, to which such a vacuum heat insulator is applied, are made small in size, or have a large inner volume, or contribute to energy saving.

32 Claims, 8 Drawing Sheets

U.S. PATENT DOCUMENTS

| | | | | |
|---|---|---|---|---|
| 5,082,335 | A | * | 1/1992 | Cur et al. .................. 312/401 |
| 5,869,407 | A | * | 2/1999 | Rusek et al. ............... 442/140 |
| 6,109,712 | A | * | 8/2000 | Haworth et al. ............ 312/400 |
| 7,485,352 | B2 | * | 2/2009 | Yuasa et al. ................ 428/34.1 |
| 2006/0159436 | A1 | * | 7/2006 | Yuasa et al. ................ 392/459 |

FOREIGN PATENT DOCUMENTS

| | | |
|---|---|---|
| JP | 63-113286 | 5/1988 |
| JP | 4-68989 | 6/1992 |
| JP | 5-106783 | 4/1993 |
| JP | 6-122574 | 5/1994 |
| JP | 7-167376 | 7/1995 |
| JP | 8-028776 | 2/1996 |
| JP | 9-4785 | 1/1997 |
| JP | 9-145239 | 6/1997 |
| JP | 10-115396 | 5/1998 |
| JP | 10-205996 | 8/1998 |
| JP | 2000-18485 | 1/2000 |
| JP | 2000-018485 | 1/2000 |
| JP | 2001-141177 | 5/2001 |
| JP | 2003-148687 | 5/2003 |

* cited by examiner

VACUUM HEAT INSULATOR, METHOD OF MANUFACTURING THE SAME, AND REFRIGERATOR USING THE SAME

This application is a U.S. national phase application of PCT international application PCT/JP2003/006915.

TECHNICAL FIELD

The present invention relates to a vacuum heat insulator using a core formed to be plate-shaped, an adiabatic body, an adiabatic box body, an adiabatic door, a storage house, and a refrigerator, to which the vacuum heat insulator is applied, a method of manufacturing the vacuum heat insulator, and a method of manufacturing the core for the vacuum heat insulator.

BACKGROUND ART

In recent years, energy saving has been strongly demanded from the viewpoint of prevention of global warming, and energy saving for domestic electric appliances has become an urgent problem. In particular, heat insulators having an excellent adiabatic performance (heat insulating efficiency) are demanded for thermally insulated equipments such as refrigerators, freezers, automatic vending machines, etc. from the viewpoint of efficient use of heat.

As general heat insulators, fiber materials such as glass wool, etc. and foam such as urethane foam, etc. are used. In order to enhance these heat insulators in adiabatic property, it is necessary to increase the heat insulator in thickness. Since there is a limitation to a space, into which heat insulators can be filled, however, such measures cannot be applied in case of the necessity for space saving and effective spatial use.

Attention is paid to vacuum heat insulators as heat insulators having a high adiabatic performance. Vacuum heat insulators are ones, in which a core is covered by an exterior covering having a gas-barrier quality, an interior of the exterior covering is reduced in pressure, and an opening of the exterior covering is fused.

Conventional vacuum heat insulators include one, in which an aggregate of inorganic fibers such as glass wool, etc. is cured by a binding agent to be used for a core. Such vacuum heat insulators are described in, for example, U.S. Patent publication No. 4,726,974 and Japanese Patent Unexamined Publication No. H8-28776. Since an aggregate of inorganic fibers is cured by means of a binding agent, the vacuum heat insulator has a sufficient strength and a sufficient planarity to be excellent in handling quality. However, such a vacuum heat insulator has the adiabatic performance (thermal conductivity) of about 0.007 W/mK at the degree of vacuum of 1.33 Pa, the adiabatic performance is same as that of a vacuum heat insulator in which powder filling is used as a core. Thus it is demanded to enhance the adiabatic performance beyond such adiabatic performance.

DISCLOSURE OF THE INVENTION

A vacuum heat insulator according to the present invention includes a core molded to be plate-shaped with the use of a binding agent. The vacuum heat insulator assumes any one of the following configurations.

A) The core contains a fiber aggregate. The fibers have an average fiber diameter of at least 0.1 μm but at most 10 μm, and voids defined by fibers have a void diameter of at most 40 μm. The core has a percentage of the voids of at least 80%.

B) The binding agent is varied in concentration in a through-thickness direction of the core.

C) A cured layer solidified by the binding agent is formed on at least one side surface of the core.

D) The core contains fibers having a length of at most 100 μm. The fibers are oriented perpendicular to a direction of heat transmission.

DETAILED DESCRIPTION OF PREFERRED EMBODIMENTS

Figure 1:
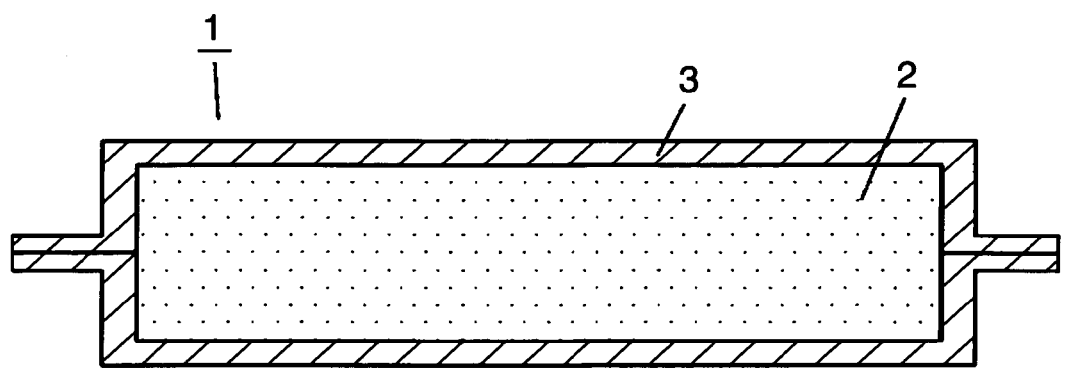
FIG. 1 is a cross sectional view of a vacuum heat insulator according to a first exemplary embodiment of the present invention.

Embodiments of the present invention will be described below with reference to the drawings. Same constituents are denoted by same reference numerals to be explained, and detailed explanations therefor will be omitted.

First Exemplary Embodiment

FIG. 1 is a cross sectional view showing a vacuum heat insulator according to a first exemplary embodiment of the present invention. Vacuum heat insulator 1 according to this embodiment includes core 2 and exterior covering 3 covering the same. Exterior covering 3 includes a gas-barrier film having a gas-barrier layer and a thermal fusing layer. An interior of exterior covering 3 is reduced in pressure. An opening of exterior covering 3 is thermally fused. Core 2 is formed by curing an inorganic fiber aggregate, which is laminated by a dry process to have an average fiber diameter of 5 µm, by means of a binding agent to make the same plate-shaped.

A method of manufacturing vacuum heat insulator 1 will be simply described below. After core 2 is dried at 140° C. for one hour, it is inserted into exterior covering 3. After an interior of exterior covering 3 is reduced to 13.3 Pa in pressure, its opening is bonded by thermal fusing.

The adiabatic performance (thermal conductivity) of vacuum heat insulator 1 fabricated in this manner is measured at an average temperature 24° C. to be 0.0035 W/mK. Void diameter between fibers is calculated by the mercury porosity analysis to present 40 µm. Since core 2 cured by a binding agent to be made plate-shaped is used, surfaces of vacuum heat insulator 1 is sufficiently planar and also sufficient in stiffness.

In the mercury porosity analysis, the void diameter (rP) is calculated by Washburn formula indicated in Formula 1 on the basis of respective values of surface tension (γHg) of mercury, contact angle (θ), and mercury injection pressure (P).

$$rP=2\gamma Hg \cos \theta /P \quad \text{(Formula 1)}$$

Void diameter corresponding to those respective pressures, under which mercury is injected, is obtained from an amount of mercury on the basis of Formula 1. Void diameter is determined by calculation from the void diameter distribution ranging from 0.1 µm to 40 µm.

Core 2 of vacuum heat insulator 1 according to this embodiment is formed from an aggregate of inorganic fibers, Core 2 has a thickness of 15 mm. Core 2 has a void diameter of 40 µm and a percentage of the voids of 94%. Core 2 has a decreasing rate of 10% in thickness due to reduction in pressure, and has a density (bulk density) of 150 kg/m$^3$, and pressure in vacuum heat insulator 1 is 13.3 Pa.

Generally, an apparent thermal conductivity (λapp) is the sum of gas thermal conductivity (λg), solid thermal conductivity (λs), radiation thermal conductivity (λr), and convection thermal conductivity (λc), and is represented by Formula 2.

$$\lambda app=\lambda g+\lambda s+\lambda r+\lambda c \quad \text{(Formula 2)}$$

However, influences of thermal conduction due to convection can be neglected under reduced pressure of about 20 kPa or less, or in the void diameter of the order of 1 mm or less. Thermal conduction due to radiation has no influence under the condition of working temperature of 100° C. or lower. Therefore, solid thermal conduction and gas thermal conduction govern thermal conduction in the vacuum heat insulator according to this embodiment.

By decreasing the fiber diameter of that aggregate of inorganic fibers, which constitutes core 2, thermal conduction through fibers decreases. Thermal conduction through contact points of adjacent fibers is also decreased and contact resistance is increased. Thereby, solid thermal conduction is decreased.

An increase in percentage of the voids leads to an increase in ratio, at which gas thermal conduction occupies all thermal conduction. By decreasing the void diameter defined by the aggregate of inorganic fibers, gaseous molecules are limited in movement and a component of gas thermal conduction is decreased, so that gas thermal conduction is decreased.

Thus, by decreasing the void diameter defined by the aggregate of inorganic fibers, solid thermal conduction is decreased. By increasing the percentage of the voids, gas thermal conduction is made dominant. Further, by decreasing the void diameter defined by the aggregate of inorganic fibers, gas thermal conduction is decreased. Accordingly, a vacuum heat insulator having a low thermal conductivity is obtained. Concretely, a sharp improvement in adiabatic performance is achieved by using an aggregate of inorganic fibers for the core of the vacuum heat insulator to provide a percentage of the voids of 80% or more and a void diameter between fibers of 40 µm or less.

In case of a fine average fiber diameter of less than 0.1 µm, inorganic fibers are decreased in productivity. Such inorganic fibers become tangled in a complex manner to be increased in probability, in which they present a fiber arrangement in parallel to a direction of thermal conduction, to be increased in quantity of thermal conduction. When the average fiber diameter is fine, complex tangling is liable to generate an aggregate and to lead to an increase in percentage of the voids while voids in and between the aggregate are increased. On the other hand, in case of the average fiber diameter over 10 µm, inorganic fibers are increased in productivity but quantity of thermal conduction through fibers is increased. Further, because of a decrease in contact resistance, solid thermal conduction is increased. An increase in fiber diameter leads to an increase in void diameter between fibers. Based on these matters, by using an aggregate of inorganic fibers having an average fiber diameter of at least 0.1 µm but at most 10 µm, a vacuum heat insulator is enhanced in adiabatic performance without deterioration in productivity.

It is preferable to use a core having 80% or more of percentage of the voids and at most 40 µm of void diameter between fibers. With such arrangement, the solid thermal conduction is decreased, gas thermal conduction is made dominant, and the gas thermal conduction is decreased.

By curing an aggregate of inorganic fibers with the use of a binder agent, a vacuum heat insulator being excellent in surface flatness and stiffness is obtained and sharply improved in service condition, productivity, and quality of handling.

Core 2 according to this embodiment is structured such that a decreasing rate of thickness due to reduction in pressure becomes 10% or lower. Therefore, vacuum heat insulator 1 is restricted in dimensional change before and after fabrication. That is, vacuum heat insulator 1 is sharply improved in dimensional stability.

Moisture adsorbents and gas adsorbents, such as physical adsorbents or chemical adsorbents, may be charged into vacuum heat insulator 1. With such a manner, the vacuum heat insulator is enhanced in reliability. The mechanism of adsorption may be any one of physical adsorption, chemical adsorption, occulusion, sorption, etc. while substances acting as a non-evaporation type getter are favorable. Concretely, physical adsorbents include synthetic zeolite, activated carbon, activated alumina, silica gel, dawsonite, hydrotalcite, etc. It is possible to make use of, as chemical adsorbents, oxides of alkali metal and alkaline earth metal, hydroxides of alkali metal and alkaline earth metal, etc. In particular, lithium oxide, lithium hydroxide, calcium oxide, calcium hydroxide, magnesium oxide, magnesium hydroxide, barium oxide, and barium hydroxide act effectively. Calcium sulphate, magnesium sulphate, sodium sulphate, sodium carbonate, potassium carbonate, calcium chloride, lithium carbonate, unsaturated fatty acid, iron compound, etc. also act effectively. Application of a substance, such as barium, magnesium, calcium, strontium, titanium, zirconium, vanadium, etc., alone, or a getter substance of an alloy of the substances is more effective. In order to adsorb and remove at least nitrogen, oxygen, water content, and carbon dioxide, such various getter substances may be mixed together for application.

A fibrous material of core 2 can make use of fiber of an inorganic material, such as glass wool, ceramic fiber, rock wool, glass fiber, alumina fiber, silica-alumina fiber, silica fiber, silicone carbide fiber, etc. having an average fiber diameter of at least 0.1 μm but at most 10 μm. Taking account of productivity, at least 0.8 μm but at most 10 μm is desirable. Although the fiber length is not specifically specified, at most 500 mm and further at most 200 mm are desirable.

While a fiber aggregate laminated by the dry process is used for core 2, it is not limited to the dry process. The core is not limited to a laminate. However, when using a laminate, heat transfer between respective layers is hard to occur. Further, it is preferable to use a fiber nonwoven web. Thereby, a continuous porous structure is formed in entire core 2, and expansion of an air remaining between layers of exterior covering 3 and core 2 at the time of reduction in pressure is prevented by the continuous porous structure. Therefore, it is possible to avoid a situation in which fused edges of exterior covering 3 are broken, so that quality is made stable.

As exterior covering 3, one capable of cutting off between core 2 and an outside air is used. For example, a laminate material of metallic foil made of stainless steel, aluminum, iron, etc. and plastic film is used. Such a laminate material is composed of at least a gas-barrier layer and a thermally fusing layer. A surface protecting layer or the like may be provided, if required. As the gas-barrier layer, it is possible to use metallic foil, plastic film on which metal, inorganic oxide, diamond-like carbon, or the like is deposited, or the like. Materials are not specifically limitative provided that they are used for the purpose of lessening gas permeation. Metal deposit films are desirable in order to restrict heat leak and to provide an excellent adiabatic performance. While foil made of aluminum, stainless steel, iron, etc. can be used as the material of metallic foil, it is not specifically limitative. A material for metal deposition is not specifically limited to aluminum, cobalt, nickel, zinc, copper, silver, a mixture thereof, etc. As a backing film being subjected to metallic deposition, polyethylene terephthalate, ethylene-vinyl alcohol copolymer resin, polyethylene naphthalate, nylon, polyamide, polyimide, etc. are preferred. A material for deposition of inorganic oxide is not limited silica, alumina, etc. Used as a thermal fusing layer are a low-density polyethylene film, a high-density polyethylene film, a non-drawn polyethylene terephthalate film, a polypropylene film, a polyacrylonitrile film, an ethylene-vinyl alcohol copolymer film, a mixture thereof, etc. However, the layer is not limited to these films. It is suitable that the thermal fusing layer have a thickness of 25 to 60 μm. This is because it is directed to providing balance among stability of a sealing quality in a process of pressure reduction and sealing, restriction on entry of gases from end surfaces of thermally fused portions, and heat leak from surfaces due to thermal conduction in case of a metallic foil as the gas-barrier layer.

Drawn products of a polyethylene terephthalate film or a polypropylene film are used for the surface protective layer. In case of providing a nylon film outside thereof, flexibility is improved and durability against folding is improved.

Metallic containers made of iron sheet, stainless sheet, zinc sheet, or the like may be used for exterior covering 3.

Exterior covering 3 may be bag-shaped like four-side sealed bags, gusset bags, L-shaped bags, pillow bags, center tape sealed bags, or the like and is not specifically limitative. Metallic sheet may be formed to be rectangular-shaped for use.

According to this embodiment, a linear low-density polyethylene film (referred below to as LLDPE) having a thickness of 50 μm is used as the thermal fusing layer. Used as the gas-barrier layer is a film formed by sticking two films, each having evaporated aluminum together at evaporated aluminum surfaces. One of the films is an ethylene-vinyl alcohol copolymer film (referred below to as EVOH) having a thickness of 15 μm with an evaporated aluminum of a film thickness of 450 angstrom thereon. The other of the films is a polyethylene terephthalate film (referred below to as PET) having a thickness of 12 μm with an evaporated aluminum of a film thickness of 450 angstrom thereon. LLDPE of the thermal fusing layer and EVOH of the gas-barrier layer are dry-laminated to constitute one of exterior coverings 3. The other of exterior coverings 3 uses LLDPE having a thickness of 50 μm as the thermal fusing layer, and an aluminum foil having a thickness of 6 μm thereon as the gas-barrier layer. Nylon having a thickness of 12 μm is used thereon as the protective layer and nylon having a thickness of 12 μm is used as the outermost layer.

A method of manufacturing a vacuum heat insulator, according to this embodiment, includes first fabricating exterior covering 3, thereafter inserting core 2 into exterior covering 3, reducing pressure in the same, and sealing the same. Alternatively, core 2 and an exterior covering composed of a roll-shaped or sheet-shaped laminate film may be placed in a decompression tank, and vacuum heat insulator 1 may be fabricated by thermally fusing the exterior covering after the exterior covering is put in a state of being placed along core 2. Vacuum heat insulator 1 may be manufactured by directly reducing pressure in exterior covering 3 with core 2 inserted thereinto and sealing the opening of exterior covering 3. Vacuum heat insulator 1 may be manufactured by inserting board-shaped core 2 into a container which is formed from a metallic sheet, connecting a vacuum pump and the metallic container by means of a pipe to reduce pressure in the container, and thereafter sealing and cutting the pipe. In this manner, there are various methods but the method is not limitative.

The core may be dried prior to insertion into the exterior covering, and adsorbents may be inserted together with the core when inserted into the exterior covering.

Second Exemplary Embodiment

Vacuum heat insulator 1 according to this embodiment is the same in fundamental constitution as that of the first exemplary embodiment shown in FIG. 1. This embodiment is different from the first exemplary embodiment in the structure of core 2. Core 2 in this embodiment is formed by coating an inorganic fiber aggregate which is laminated by the dry process to have an average fiber diameter of 7 μM, with a solid component of a phenol resin of 10 wt % as a binding agent and curing the same to make the same plate-shaped.

The adiabatic performance (thermal conductivity) of vacuum heat insulator 1 fabricated in this manner is measured at an average temperature 24° C. to be 0.0041 W/mK. Curing is adequately achieved since addition of the binding agent is 10 wt %. Since a decreasing rate of the thickness of core 2 due to reduction in pressure becomes 6%, atmospheric compression is small when vacuum heat insulator 1 is made, and the dimensional stability is sharply improved.

Core 2 of vacuum heat insulator 1 according to this embodiment is composed of an aggregate of inorganic fibers having a fiber diameter of 7 μm and has a thickness of 15 mm. Core 2 has a void diameter of 40 μm and a percentage of the voids of 92%. A decreasing rate of the thickness of core 2 due to reduction in pressure is 6%, a density (bulk density) of the core is 200 kg/m$^3$, and pressure in vacuum heat insulator 1 is 13.3 Pa.

A binding agent in this embodiment includes an organic binder having at least a thermosetting property. Fatty acid denatured alkyd resins, amino resins, epoxy resins, polyamide resins, urethane resins, acrylic resins, petroleum resins, urea resins, melamine resins, xylene resins, furan resins, etc. in addition to phenol resins may be used as such organic binder. An addition of the binding agent is appropriately 8 to 20 wt % relative to a weight of the core and preferably 10 wt %.

Thus this embodiment includes an organic binder having at least a thermosetting property in addition to the constitution of the first exemplary embodiment. Thereby, an aggregate of inorganic fibers prior to curing of the binding agent can be subjected to compression molding into an optional shape with the use of a molding die. When heated in a state of compression molding in the molding die, the binding agent is cured by heating, so that the molded core is made stable in shape.

The remainder of the constitution is the same as that of the first exemplary embodiment, and so an explanation therefor is omitted.

Third Exemplary Embodiment

Vacuum heat insulator 1 according to a third exemplary embodiment is the same in fundamental constitution as that of the first exemplary embodiment shown in FIG. 1. This embodiment is different from the first exemplary embodiment in the structure of core 2. Core 2 in this embodiment is formed by coating an inorganic fiber aggregate which is laminated by the dry process to have an average fiber diameter of 0.8 μm, with a phenol resin of 10 wt % as a solid component and curing the same to make the same plate-shaped.

The adiabatic performance (thermal conductivity) of vacuum heat insulator 1 fabricated in this manner is measured at an average temperature 24° C. to be 0.0024 W/mK. Curing is adequately achieved since addition of the binding agent is 10 wt %. Since a decreasing rate of the thickness of core 2 due to reduction in pressure is 5%, atmospheric compression is small when vacuum heat insulator 1 is made, and the dimensional stability is sharply improved.

Core 2 of vacuum heat insulator 1 according to this embodiment is composed of an aggregate of inorganic fibers having a fiber diameter of 0.8 μm and has a thickness of 15 mm. Core 2 has a void diameter of 9 μm and a percentage of the voids of 92%. A decreasing rate of the thickness of core 2 due to reduction in pressure is 5%, a density (bulk density) of the core is 200 kg/m$^3$, and pressure in vacuum heat insulator 1 is 13.3 Pa.

In this manner, according to this embodiment, a vacuum heat insulator, which is easy to mold, stable in shape, and excellent in adiabatic property, is obtained in the same manner as in the second exemplary embodiment.

Fourth Exemplary Embodiment

Vacuum heat insulator 1 according to this embodiment is the same in fundamental constitution as that of the first exemplary embodiment shown in FIG. 1. This Embodiment is different from the first exemplary embodiment in the structure of core 2. Core 2 in this embodiment is formed by coating an inorganic fiber aggregate which is laminated by the dry process to have an average fiber diameter of 3.5 μm, with a binding agent of 10 wt % as a solid component and curing the same to make the same plate-shaped. The binding agent includes water glass differently from the first and second embodiments.

The adiabatic performance (thermal conductivity) of vacuum heat insulator 1 fabricated in this manner is measured at an average temperature 24° C. to be 0.0029 W/mK. Curing is adequately achieved since addition of the binding agent is 10 wt %. Since a decreasing rate of the thickness of core 2 due to reduction in pressure is 10%, atmospheric compression is small when vacuum heat insulator 1 is made, and the dimensional stability is sharply improved.

Core 2 of vacuum heat insulator 1 according to this embodiment is composed of an aggregate of inorganic fibers having a fiber diameter of 3.5 μm and has a thickness of 15 mm. Core 2 has a void diameter of 30 μm and a percentage of the voids of 90%. A decreasing rate of the thickness of core 2 due to reduction in pressure is 10%, a density (bulk density) of the core is 250 kg/m$^3$, and pressure in vacuum heat insulator 1 is 13.3 Pa.

In this manner, according to this embodiment, a vacuum heat insulator which is easy to mold, stable in shape, and excellent in adiabatic property, is obtained in the same manner as in the second embodiment. Since the density (bulk density) of the core is 250 kg/m$^3$, the core is further increased in stiffness to lead an increase in mechanical strength when vacuum heat insulator 1 is made, so that shape stability is improved in use.

The binder in this embodiment includes an inorganic binder having at least a thermosetting property. Alumina sol, colloidal silica, organo-silica sol, sodium silicate, lithium silicate, potassium silicate, silica magnesium oxide, gypsum, boric acid compounds, phosphoric acid compounds, alkyl silicate, etc. in addition to water glass may be used as such inorganic binder. Boric acid base compounds include respective hydrates of boric acid, metaboric acid, boric oxide and tetra sodium borate, or anhydrates of sodium borate group, ammonium borate group, lithium borate group, manganese borate group, calcium borate group, aluminum borate group, zinc borate group, perborate group, alkylborate group, boroxine derivatives, etc. Phosphoric acid compounds include phosphoric acid, phosphorus oxides such as diphosphate pentaoxide or the like, or monobasic phosphate, dibasic phosphate, tribasic phosphate, pyrophosphate, tripolyphosphate, metaphosphate, etc., and their sodium salt, potassium salt, ammonium salt, magnesium salt, aluminum salt, etc. Among these substances, glass forming substances, or water soluble substances are preferable to include, for example, boric acid, metaboric acid, boric oxide, borax, or phosphoric acid, monobasic aluminum phosphate, sodium hexametaphosphorate, etc. One or two or more of the substances described above are mixed, or other binding agents are mixed, or they are diluted to be used as a binding agent for moldings to fabricate a core. An addition of the binding agent is appropriately 0.1 to 20 wt % relative to a weight of the core and preferably 1 to 10 wt %.

The remainder of the constitution is the same as that of the second exemplary embodiment, and so an explanation therefor is omitted.

The organic binder described with respect to the second and third embodiments and the inorganic binder described above may be combined to be used a binding agent.

Fifth Exemplary Embodiment

Vacuum heat insulator 1 according to this embodiment is the same in fundamental constitution as that of the first exemplary embodiment shown in FIG. 1. This embodiment is the same in fundamental materials as those in the second exemplary embodiment. This embodiment is different from the second embodiment in the density of core 2. That is, according to this embodiment, an inorganic fiber aggregate which is laminated by the dry process to have an average fiber diameter of 0.8 μm is coated with a solid component of a binding agent of 10 wt % and cured to be made plate-shaped, and its density (bulk density) is 250 kg/m³.

The adiabatic performance (thermal conductivity) of vacuum heat insulator 1 fabricated in this manner is measured at an average temperature 24° C. to be 0.0023 W/mK. Curing is adequately achieved since addition of the binding agent is 10 wt %. Further, since a decreasing rate of the thickness of core 2 due to reduction in pressure is 2%, atmospheric compression is small when vacuum heat insulator 1 is made, and the dimensional stability is sharply improved.

Core 2 of vacuum heat insulator 1 according to this embodiment is composed of an aggregate of inorganic fibers having a fiber diameter of 0.8 μm and has a thickness of 15 mm. Core 2 has a void diameter of 8 μm and a percentage of the voids of 90%. A decreasing rate of the thickness of core 2 due to reduction in pressure is 2%, a density (bulk density) of the core is 250 kg/m³, and pressure in vacuum heat insulator 1 is 13.3 Pa.

In this manner, according to this embodiment, a vacuum heat insulator which is easy to mold, stable in shape, and excellent in adiabatic property, is obtained in the same manner as in the fourth exemplary embodiment.

Core 2 according to this embodiment appropriately has a density of 100 to 400 kg/m³ and preferably 150 to 250 kg/m³. When the density of the core exceeds 400 kg/m³, shape stability is further improved but solid thermal conduction is increased to lead to a decrease in adiabatic performance and an increase in weight, which makes handling hard. When the density of the core is less than 100 kg/m³, vacuum heat insulator 1 is decreased in strength. This is the same with other embodiments.

A binding agent used in this embodiment may include an inorganic binder in the same manner as in the fourth exemplary embodiment.

An explanation will be given hereinafter to a conventional vacuum heat insulator which departs from the respective structures described in the first to fifth exemplary embodiments.

First, an explanation is given to the case where an inorganic fiber aggregate having an average fiber diameter of 4.5 μm is used as a core of a vacuum heat insulator and is not cured by a binding agent. Fabrication is performed in the same manner as the first exemplary embodiment with respect to other matters. A core of the vacuum heat insulator has a thickness of 15 mm, a void diameter of 35 μm and a percentage of the voids of 93%. A decreasing rate of the thickness of the core due to reduction in pressure is 80%, a density (bulk density) of the core is 180 kg/m³, and pressure in the vacuum heat insulator is 13.3 Pa.

While the thermal conductivity of the vacuum heat insulator is favorably 0.0022 W/mK, surfaces of the vacuum heat insulator become wavy and the vacuum heat insulator is not sufficient in performance with respect to surface flatness and stiffness because the inorganic fiber aggregate is not cured by a binding agent. The decreasing rate of the thickness of the core due to reduction in pressure is as large as 80%, and the vacuum heat insulator is poor in dimensional stability to be unfit for use.

Subsequently, an explanation is given to the case where an inorganic fiber aggregate having an average fiber diameter of 0.8 μm is used as a core of a vacuum heat insulator and dried and compressed after being immersed in water. The inorganic fiber includes ceramic fibers or the like of which components are not soluble in water. Fabrication is performed in the same manner as the first exemplary embodiment with respect to other matters. A core of the vacuum heat insulator has a thickness of 15 mm, a void diameter of 10 μm and a percentage of the voids of 92%. A decreasing rate of the thickness of the core due to reduction in pressure is 40%, a density of the core is 200 kg/m³, and pressure in the vacuum heat insulator is 13.3 Pa.

While the thermal conductivity of the vacuum heat insulator is favorably 0.0028 W/mK, surfaces of the vacuum heat insulator become wavy and the vacuum heat insulator is not sufficient in performance with respect to surface flatness and stiffness because the inorganic fiber aggregate is not cured by a binding agent. A decreasing rate of the thickness of the core due to reduction in pressure is as large as 40%, and the vacuum heat insulator is poor in dimensional stability.

Subsequently, an explanation is given to the case where an inorganic fiber aggregate having an average fiber diameter of 0.8 μm is cured by a binding agent to provide a plate-shaped core of a vacuum heat insulator and a density of the core is 65 kg/m³. Fabrication is performed in the same manner as the first exemplary embodiment with respect to other matters. A core of the vacuum heat insulator has a thickness of 15 mm, a void diameter of 20 μm and a percentage of the voids of 97%. A decreasing rate of the thickness of the core due to reduction in pressure is 66%, a density of the core is 65 kg/m³, and pressure in the vacuum heat insulator is 13.3 Pa.

While the thermal conductivity of the vacuum heat insulator is favorably 0.0041 W/mK, the density of the core is 65 kg/m³, and the core is not sufficient in stiffness. Since the density of the core is 65 kg/m³, the decreasing rate of the thickness of the core due to reduction in pressure is as large as 66%, and the vacuum heat insulator is poor in dimensional stability.

Subsequently, an explanation is given to the case where a core of a vacuum heat insulator includes an inorganic fiber aggregate having an average fiber diameter of 4.5 μm and a density of the core is 700 kg/m³. Fabrication is performed in the same manner as the first exemplary embodiment with respect to other matters. The core of the vacuum heat insulator has a thickness of 15 mm, a void diameter of 35 μm and a percentage of the voids of 72%. A decreasing rate of the thickness of the core due to reduction in pressure is 1%, a density of the core is 700 kg/m³, and pressure in the vacuum heat insulator is 13.3 Pa.

Since the core has a density of 700 kg/m³, the core of the vacuum heat insulator is harder than needed. Therefore, the decreasing rate of the thickness of the core due to reduction in pressure becomes 1%, so that the vacuum heat insulator is improved in dimensional stability but sharply decreased in workability. While the core is further increased in stiffness and the vacuum heat insulator is enhanced in dimensional stability when being formed, solid thermal conduction is increased because solid point contact is increased. Therefore, as compared with a core containing no binding agent, the adiabatic performance is sharply decreased and the thermal conductivity is 0.0058 W/mK.

Summarizing the first to fifth exemplary embodiments and the conventional vacuum heat insulators, it is preferred that an inorganic fiber aggregate used for a core of a vacuum heat insulator be formed to be plate-shaped and cured by a binding agent. It is found that inorganic fibers preferably have an average fiber diameter of at least 0.1 μm but at most 10 μm, voids defined by inorganic fibers have a void diameter of at most 40 μm and a core have a percentage of the voids of at least 80%. The reason for this has been described with respect to the first exemplary embodiment and so a detailed explanation is omitted.

It is found that by curing an aggregate of inorganic fibers with the use of a binder agent, a vacuum heat insulator can be made excellent in surface flatness and stiffness and sharply improved in service condition, productivity, and quality of handling.

It is found that when a core has a density of at least 100 kg/m$^3$ but at most 400 kg/m$^3$, the core can be increased in stiffness while maintained in adiabatic performance, and the vacuum heat insulator is increased in mechanical strength when made and enhanced in shape stability in use.

By structuring a core so that a decreasing rate of the thickness of the core due to reduction in pressure becomes 10% or less, dimensional changes before and after fabrication of a vacuum heat insulator are restricted, that is, dimensional stability is greatly improved.

At least an organic binder, or at least an inorganic binder is preferable as a binding agent to fix an inorganic fiber aggregate in a molded form. Further, a binding agent is more preferable to have a thermosetting property. By using such binding agent, an inorganic fiber aggregate prior to curing of the binding agent can be readily subjected to compression molding into an optional shape. When heating is performed in a state of compression molding with a molding die, a core becomes stable in shape since the binding agent is cured.

An inorganic fiber aggregate is described as being used for a core of a vacuum heat insulator. However, a material of fibers is not limited thereto but may be an organic material. Organic fibers including natural fibers such as cotton, etc. and synthetic fibers such as polyester, nylon, aramid, etc. can be used for the organic fibers.

Sixth Exemplary Embodiment

Figure 2:
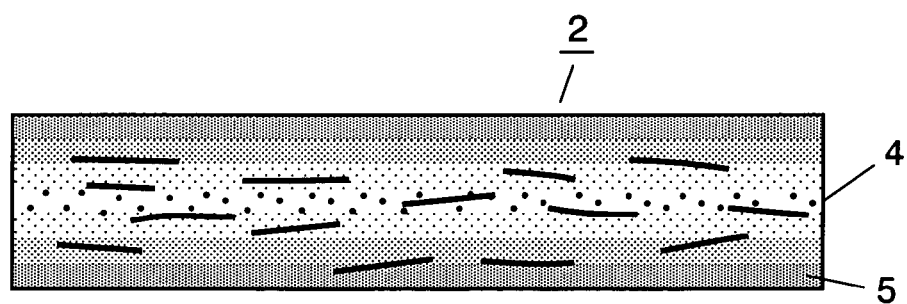
FIG. 2 is a cross sectional view of a core of a vacuum heat insulator according to a sixth exemplary embodiment of the present invention.

A cross sectional view of a vacuum heat insulator according to a sixth exemplary embodiment of the invention is the same as FIG. 1 in the first exemplary embodiment, and the sixth exemplary embodiment is the same in fundamental constitution except a core as the first exemplary embodiment. FIG. 2 is a cross sectional view of a core of the vacuum heat insulator according to the sixth exemplary embodiment of the present invention.

Molded body 4 is molded by laminating glass wool having an average fiber diameter of 5 μm, an average fiber length of 10 mm, and a true specific gravity of 2.5 g/cm$^3$ to a predetermined shape. Binding agent 5 is prepared by dissolving water glass of 10 wt % in water of 90 wt %. The water solution of water glass having the same weight as that of glass wool is used. The water solution of water glass is sprayed onto both surfaces of molded body 4 by means of a spray device, and then is pressed in a hot blast circulating furnace at 450° C. for 20 minutes. Thus core 2 having a thickness of 15 mm and a density of 235 kg/m$^3$ is obtained. Core 2 has a thermal conductivity of 0.35 W/mK.

Figure 5:
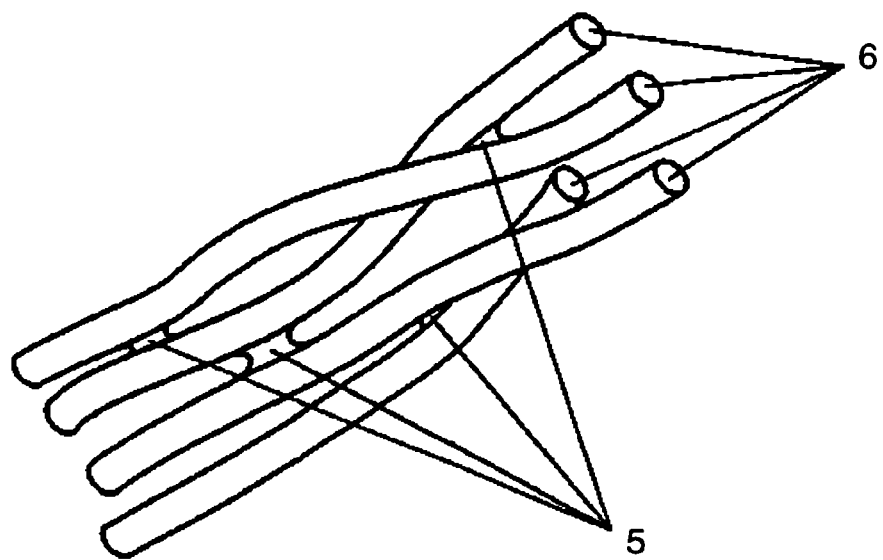
FIG. 5 is a conceptual view showing an appearance of a surface of the core, observed with an optical microscope, according to the sixth exemplary embodiment of the present invention.

A central layer of core 2 fabricated in the above manner is small in content of binding agent 5, and a large quantity of binding agent 5 is cured nearer to a surface layer to form a hardened layer on the surface. The core has a surface hardness of 65. In observing an appearance of the surface of core 2 with an optical microscope, fibers crossing one another are bound and cured by the binding agent as shown in FIG. 5.

Hardness is defined by a value obtained when hardness of a surface of a core is measured by a durometer, and it is meant that the larger the value the harder and the smaller the value the softer.

Vacuum heat insulator 1 is fabricated in the following manner. First, core 2 is dried in a drying furnace at 140° C. for one hour. Thereafter, core 2 is inserted into exterior covering 3. An interior of the exterior covering is reduced in pressure up to 3 Pa and sealed.

The thermal conductivity of vacuum heat insulator 1 is 0.0022 W/mK at an average temperature 24° C. The surface hardness is 70. In evaluating deterioration of the heat insulator through an accelerated test in order to ascertain reliability with passage of time, the thermal conductivity under conditions of passage of 10 years is 0.0050 W/mK at an average temperature 24° C. At this time, core 2 has a surface hardness of 60.

Seventh Exemplary Embodiment

Vacuum heat insulator 1 according to a seventh exemplary embodiment is the same in fundamental constitution as that of the sixth exemplary embodiment. This embodiment is different from the sixth exemplary embodiment in a binding agent for a core and a molding method.

Binding agent 5 used for a core according to this embodiment is prepared by dissolving a boric acid of 3 wt % in water of 97 wt %. The water solution of boric acid having the same weight as that of glass wool is used.

The water solution of boric acid is sprayed onto both surfaces of a molded body 4 by means of a spray device, and then is once pressed at a room temperature of around 25° C. Subsequently, it is pressed in a hot blast circulating furnace at 350° C. for 20 minutes, and thus a core 2 having a thickness of 15 mm, a density of 200 kg/m$^3$, a thermal conductivity of 0.34 W/mK is obtained. As similar to the sixth exemplary embodiment, a central layer of core 2 is also bound by a slight quantity of binding agent 5, and the binding agent is increased in quantity toward a surface layer. That is, the core according to this embodiment is also formed on a surface thereof with a hardened layer. Core 2 has a surface hardness of 45.

Vacuum heat insulator 1 making use of such core 2 has a thermal conductivity of 0.0020 W/mK at an average temperature 24° C., a thickness of 14 mm with 1 mm compressed, and a density of 214 kg/m$^3$. The surface hardness is 60. After respective dimensions of the core in a state of being in the vacuum heat insulator is measured, the vacuum heat insulator is disassembled and a weight of the core is measured, from results of which a density may be calculated. In evaluating deterioration of the heat insulator through an accelerated test in order to ascertain reliability with passage of time, the thermal conductivity under conditions of passage of 10 years is 0.012 W/mK at an average temperature 24° C. At this time, core 2 has a surface hardness of 35.

As compared with the vacuum heat insulator according to the sixth exemplary embodiment, the binding agent includes a boric acid and pressing at room temperature is performed prior to heating compression, so that the binding agent remains also in the inside of the core and is cured inside the surface layer without generation of migration. Therefore, an interior of the core is enhanced in stiffness and as a whole in strength.

In the above manufacturing method, laminated fibers coated with the binding agent prior to heating compression are compressed at a lower temperature than 100° C. Compression at room temperature in which moisture is hard to evaporate, is more preferable.

Subsequently, heating compression is performed at temperature of 100° C. or higher, which aims at evaporation of moisture and curing of the binding agent, so heating at a higher temperature than the curing temperature of the binding agent is desirable. 600° C. or lower is preferable from the viewpoint of preventing the binding agent from permeating into the laminate excessively and fusion of fibers at the time of heating compression.

Generally, when fibers coated with a binding agent at the time of fiberization are used to fabricate a molded body, a plate-shaped body having a uniform distribution of the binding agent in the molded body is easily obtained and so it is difficult to obtain a molded body having a concentration gradient. According to the manufacturing method according to this embodiment, however, fibers are laminated in a predetermined configuration and a binding agent is coated on at least one surface of the laminated fibers. The laminated fibers are once compressed at a lower temperature than 100° C., that is, a temperature lower than or equal to the evaporating temperature of moisture. Thereby, a state comes out, in which a surface layer is large in concentration of the binding agent and an interior is small in concentration of the binding agent. Subsequently, compressing and heating are performed at a temperature of at least 100° C. to evaporate the moisture. Thereby, it is possible to obtain a core in which the concentration of the binding agent is varied in a through-thickness direction and a small quantity of binding agent binds in the molded body, and which is excellent in strength.

Figure 3:
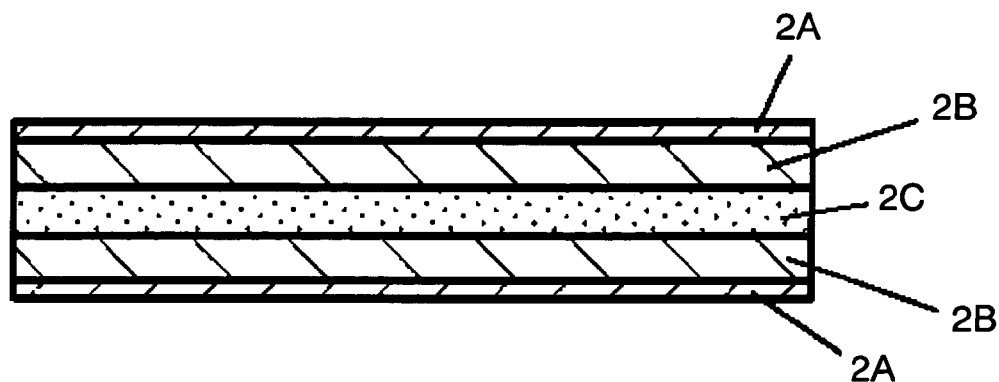
FIG. 3 is a cross sectional view of a core of a vacuum heat insulator according to a seventh exemplary embodiment of the present invention.

Subsequently, an example of analysis of the concentration distribution of a binding agent in a direction along the thickness of core 2 is indicated. FIG. 3 is a cross sectional view showing a core of a vacuum heat insulator according to this embodiment. First, core 2 is divided into front and back surface layers of 1 mm in a through-thickness direction to provide skin layers 2A, and a remaining inner layer of the core is divided into three layers, that is, two outer layers to constitute intermediate layers 2B, and an innermost layer to constitute central layer 2C.

Samples having a weight of 1 g are collected from skin layers 2A, intermediate layers 2B, and central layer 2C to be torn to small pieces, and pure water of 100 ml is added to the respective samples of 1 g, shaken lightly, and mixed. The binding agent is eluted by ultrasonic bath for 15 minutes and its effluent is filtered. A quantity of boron eluted in the filtrate is found by ICP emission spectroscopic analysis method. Table 1 indicates the results. An eluted quantity per each sample of 1 g is 3190 µg for skin layers 2A, 2050 µg for intermediate layers 2B, and 995 µg for central layer 2C. The same test was carried out in order to find a quantity of boron eluted from glass wool 4 with the result that the eluted quantity was 182 µg. Accordingly, it is found that the binding agent is contained in ratios per each layer of 1 g such that 28.5% of the total quantity of the binding agent is contained in skin layer 2A, 17.7% is contained in intermediate layer 2B, 7.7% is contained in central layer 2C, 17.7% is contained in intermediate layer 2B on the opposite side, and 28.5% is contained in skin layer 2A on a front side thereof.

TABLE 1

|  | Analytical value of quantity of boron (µg/g) | Correction value of quantity of boron (µg/g) | Concentration distribution of boric acid (%) |
| --- | --- | --- | --- |
| Skin layer 2A (upper side) | 3190 | 3013 | 28.5 |
| Intermediate layer 2B (upper side) | 2050 | 1873 | 17.7 |
| Central layer 2C | 995 | 818 | 7.6 |
| Intermediate layer 2B (lower side) | 2050 | 1873 | 17.7 |
| Skin layer 2A (lower side) | 3190 | 3013 | 28.5 |
| Glass wool 4 | 182 | — | — |

The values of concentration distribution of the binding agent are exemplary, the values are preferably varied in a through-thickness direction, and the surface layers of the core are more preferably larger in concentration of the binding agent than an interior thereof.

For example, it suffices that skin layers 2A be preferably larger in concentration of the binding agent than central layer 2C, and intermediate layer 2B be preferably larger in concentration of the binding agent than skin layers 2A, or intermediate layer 2B be preferably smaller in concentration of the binding agent than central layer 2C.

Ratios, in which the core is divided, are not specifically prescribed.

This is applicable to both a core prior to fabrication of a vacuum heat insulator and a core taken out by disassembling the vacuum heat insulator after the fabrication.

The above analytical method is exemplary, and provided that distribution of quantities of the binding agent is found, the analytical method is not specifically prescribed. It is enough to find that the binding agent is varied in concentration when visually seeing a cross section of a core.

Eighth Exemplary Embodiment

Vacuum heat insulator 1 according to an eighth exemplary embodiment is the same in fundamental constitution as that of the seventh exemplary embodiment. According to this embodiment, a core includes plate-shaped molded bodies of multi-layered structure.

Figure 4:
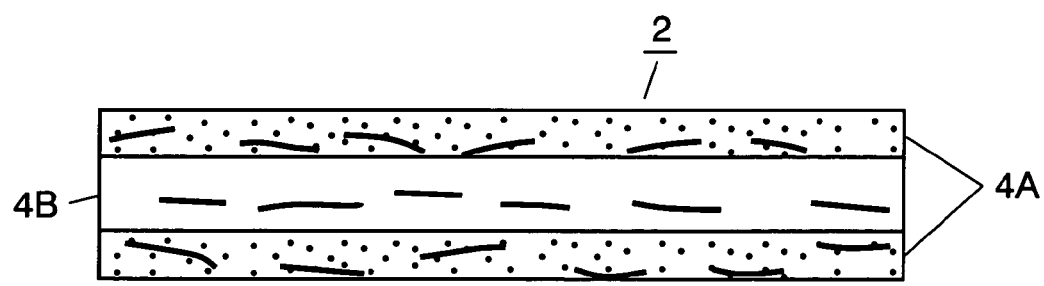
FIG. 4 is a cross sectional view of a core of a vacuum heat insulator according to an eighth exemplary embodiment 8 of the present invention.

FIG. 4 is a cross sectional view of a core of a vacuum heat insulator according to this embodiment. In FIG. 4, core 2 includes three plate-shaped molded bodies (referred below to as molded bodies) 4A, 4B having substantially the same thickness.

Two molded bodies 4A include glass wool which has an average fiber diameter of 5 µm, an average fiber length of 10 mm, and a true specific gravity of 2.5 g/cm$^3$, and are formed by laminating to predetermined shapes, and a binding agent is added to the molded bodies. The binding agent is prepared by dissolving a boric acid of 5 wt % in water of 95 wt %. The water solution of boric acid having the same weight as that of glass wool is used. The water solution of boric acid is sprayed onto both surfaces of the molded bodies by means of a spray device, and then is pressed at room temperature. They are pressed in a hot blast circulating furnace at 350° C. for 20 minutes, and molded bodies 4A having a thickness of 5 mm and a density of 230 kg/m$^3$ are obtained.

Another molded body 4B is formed by subjecting glass wool which has an average fiber diameter of 5 µm and an average fiber length of 10 mm, to compressing and heating at 350° C. without the use of a binding agent, and has a thickness of 5 mm and a density of 220 kg/m$^3$.

Three plate-shaped molded bodies 4A, 4B are used to be overlapped such that molded bodies 4A with a boric acid are disposed outside and molded body 4B with only glass wool is disposed inside, thus providing core 2. Molded body 4A is disposed on the surface is a cured layer. Its surface hardness is 45. Entire core 2 has a density of 190 kg/m³ and a thermal conductivity of 0.34 W/mK.

Vacuum heat insulator 1 with such core 2 has a thermal conductivity of 0.0019 W/mK at an average temperature 24° C. and a surface hardness of 60. In evaluating deterioration of the heat insulator through an accelerated test in order to ascertain reliability with passage of time, the thermal conductivity under conditions of passage of 10 years is 0.014 W/mK at an average temperature 24° C. At this time, core 2 has a surface hardness of 35.

Since the plate-shaped molded bodies with a boric acid binding agent are provided for the surface layers and the plate-shaped molded body with only glass wool is provided for the central layer, a core having a small solid thermal conductivity and an excellent adiabatic performance is obtained because of absence of a binding agent in the central layer.

Subsequently, an explanation is given to a vacuum heat insulator, in which a binding agent is evenly dispersed unlike the sixth to eighth exemplary embodiments.

A comparative example is the same in fundamental constitution as that of the sixth exemplary embodiment. A core is prepared by spraying a binding agent on fiber surfaces of glass wool which has an average fiber diameter of 5 μm after fiberization, so that the binding agent evenly adheres the surfaces. The binding agent is prepared by dissolving a phenol resin of 10 wt % in water of 90 wt %. A water solution of phenol resin having the same weight as that of glass wool is used.

The raw stock with the binding agent is laminated to a predetermined density, and pressed in a hot blast circulating furnace at 200° C. for 20 minutes in a manner to have a density of 200 kg/m³. The core fabricated in this manner is dried in a drying furnace at 140° C. for one hour, and inserted into an exterior covering, and an interior of the exterior covering is reduced in pressure to 3 Pa and sealed.

The vacuum heat insulator of the above comparative example has a thermal conductivity of 0.0040 W/mK at an average temperature 24° C. However, in evaluating deterioration of the heat insulator through an accelerated test in order to ascertain reliability, the thermal conductivity under conditions of passage of 10 years is 0.021 W/mK at an average temperature 24° C. Since a phenol resin is used for the binding agent and evenly cured in the core, both the initial capacity and the capacity with passage of time are degraded as compared with the sixth exemplary embodiment.

Since the binding agent is evenly cured, the initial performance is degraded and a long period of time for exhaustion at the time of fabrication of the vacuum heat insulator is needed as compared with the seventh exemplary embodiment. In molding a core by the use of fibers such as glass wool, etc. and a binding agent, the core has a large solid thermal conductivity when the binding agent is dispersed throughout the glass wool to put individual fibers in a bound state over an interior of the fiber molded body.

In contrast, portions in which the binding agent is small in concentration are provided according to the sixth to eighth exemplary embodiments, whereby the solid thermal conductivity becomes small and the adiabatic performance is improved. The portions in which the binding agent is small in concentration are decreased in resistance to exhaustion, so that a period of time required for evacuation is shortened and the vacuum heat insulator is enhanced in productivity. By using such a core that the binding agent is varied in concentration in a through-thickness direction of a molded body, there is obtained a vacuum heat insulator which is excellent in stiffness of a core, adiabatic performance, and productivity.

With the above structure, the surface layers are preferably larger in concentration of the binding agent than the inner layer in a through-thickness direction of the core. That is, it is preferable to form cured layers on the surfaces. With the construction, in addition to the above effect, it is possible to obtain a core having an excellent surface flatness and a vacuum heat insulator being excellent in outward appearance.

In the sixth to eighth exemplary embodiments, core 2 may include a board made of organic or inorganic fibers, a board formed by solidification of powder, etc. and is not specifically limitative.

For example, a core including a board made of a fibrous material can use a known material such as inorganic fibers, or organic fibers including natural fibers such as cotton, etc. and synthetic fibers such as polyester, nylon, aramid, etc as described in the first exemplary embodiment.

A core including a board formed by solidification of powder can use inorganic powder such as silica, pearlite, carbon black, etc. Alternatively, known materials are usable as by solidifying organic powder such as powder of synthetic resins, etc. by means of a fiber binding agent, or inorganic or organic liquid binding agent.

With the above structure, however, use of a fibrous material for a core is preferable. Use of a fibrous material makes it possible to obtain a vacuum heat insulator which is easy to mold, small in solid thermal conductivity, that is, has excellent in moldability and adiabatic property. In particular, it is preferable to use a fibrous material for a core on surfaces of which a binding agent is high in concentration and cured layers are provided. With some binding agents, cured layers may be formed only on surface layers of a molded body and almost a small quantity of binding agent having permeated inside is moved to the surface layers due to migration to form little cured layers inside. In this case, it is feared that crack is generated inside and an entire molded body is decreased in strength. In contrast, it is preferable to obtain a plate-shaped molded body by forming fibers into a plate shape, thereafter coating a binding agent on surfaces thereof, and subjecting the formed fiber to compressing and heating. Thus layers having a high concentration owing to curing of the coated binding agent are formed on the surface layers. A small quantity of binding agent permeated inside does not migrate so much but is cured inside the surface layers. Consequently, it is possible to obtain a molded body in which the binding agent is varied in concentration in a through-thickness direction and a small quantity of binding agent is cured inside, and which is excellent in strength.

Inorganic fibers are desirable in terms of heat resistance at the time of compressing and heating. Especially, glass wool and glass fiber are preferable because of a high weather resistance and a favorable water resistance. In particular, inorganic fibers made of boron containing glass are desirable because of excellent weather resistance and water resistance.

In case of forming a core from fibers, the fibers are not specifically limited in fiber diameter. From the viewpoint of enabling forming a continuous porous structure and obtaining a core which is high surface hardness and lightweight, the fiber diameter desirably ranges from 0.1 to 20 μm, preferably from 1 to 10 μm, and further preferably from 2 to 7 μm. In particular, in case of forming a core from a laminate, fibers having an average fiber length of 5 to 15 mm are preferably used from the viewpoint of preventing peel of the laminate but not limitative. Non-woven web may be used in the same manner as in the first exemplary embodiment.

The powder described above may be added to a fibrous material for a core. Known materials such as pulverized pieces of a foam resin such as urethane foam, phenol foam, styrene foam, etc. may be used appropriately.

Inorganic or organic binding agents described with respect to the second to fourth exemplary embodiment are usable as a binding agent. Alternatively, organic binding agents formed of thermoplastic resins such as vinyl acetate, acrylic resins, etc., or natural adhesives, etc. will do. It is also possible to mix these materials for use, or to dilute them with water or a known organic solvent for use. However, it is preferable to use an inorganic material for a binding agent. By virtue of using an inorganic material for a binding agent, gases generated from the binding agent with passage of time decrease and a vacuum heat insulator is enhanced in adiabatic performance with passage of time. Further, the binding agent preferably contains at least one of boric acid, borate, or phosphoric acid, phosphate, or heated products thereof. Some ones of these substance themselves form a glassy substance and have a good affinity for glass fibers to be hard to migrate.

A method of adhering a binding agent to a core material is not specifically prescribed but includes adhering by coating or spraying a binding agent or its diluted solution. Concretely, a binding agent is sprayed after a core material is molded to some extent, and thereafter compressing and heating is performed, thereby enabling obtaining a molded body, in which the binding agent is varied in concentration in a through-thickness direction of the plate-shaped molded body.

In case of using a fibrous material for a core, a binding agent or its diluted solution is sprayed at the time of fiberization. Fibers in which a binding agent is large in concentration are arranged in certain portions of a plate-shaped molded body, and fibers, in which a binding agent is small in concentration or a binding agent is absent, are arranged in the remaining portions. Thereafter, a fiber laminated body is solidified by compressing and heating or the like. By fabricating a core in this manner, a board, in which a binding agent is varied in concentration in a through-thickness direction of a molded body, is also obtained.

A core varied in concentration in a through-thickness direction is also obtained by combining two or more of a plate-shaped molded body, in which a binding agent is large in concentration, and a plate-shaped molded body, in which a binding agent is small in concentration.

It is desirable to make a binding agent adhering in a manner that the agent has a concentration in which a solid of the binding agent is at least 0.1 wt % but at most 20 wt % relative to the binding agent. This is because as a binding agent is increased in quantity, an increase in gases generated from the binding agent and an increase in solid thermal conductivity are feared to have adverse influences on the adiabatic performance of a vacuum heat insulator. On the other hand, a fiber laminated body is insufficiently solidified when a binding agent is small in quantity.

It suffices that a binding agent is different in concentration at least between certain portions and other certain portions in a through-thickness direction of a core. It aims at producing an effect that those portions in which a binding agent is small in concentration are decreased in solid thermal conductivity and resistance to exhaustion, and those portions in which a binding agent is large in concentration are given stiffness of a board. In particular, those portions in which a binding agent is large in concentration preferably define at least one surface layer of a core or both surface layers. This is because a finished vacuum heat insulator is excellent in strength and favorable in surface flatness.

As similar to the first to fifth exemplary embodiments, it is desired that a core be molded to have a density of 100 kg/m$^3$ to 400 kg/m$^3$, and density may be varied inside. A core more preferably has a density of from 120 to 300 kg/m$^3$ and further preferably from 150 to 250 kg/m$^3$. The reason for this is the same as in the fifth exemplary embodiment.

Core 2 preferably has a surface hardness of 15 to 70 and desirably preferably a surface hardness in the range of 20 to 40. With the surface hardness of 15 or more, it is possible to ensure a handling quality and surface flatness. On the other hand, with the surface hardness of 70 or less, waste disposal of heat insulators is facilitated after refrigerators are discharged. The surface hardness corresponds to that of core 2 prior to packaging with exterior covering 3. Accordingly, a vacuum heat insulator after packaging with exterior covering 3 preferably has a surface hardness of 50 to 80 and desirably a surface hardness in the range of 60 to 75.

The surface hardness manifests owing to formation of a cured layer on surfaces of core 2, and fibers or powder particles in the cured layer are thermally fixed by a binding agent. That is, fibers or powder particles are bound by the binding agent to thereby achieve formation of the cured layer. The cured layer is small in void ratio and formed by binding of fibers or powder with the binding agent whereby it is high in stiffness. Accordingly, by forming such cured layer at least on one surface of core 2, preferably on both surfaces thereof, core 2 is enhanced in stiffness and made favorable in handling quality. Since core 2 is increased in hardness, depression or large irregularities are little generated on the surfaces of heat insulator 1 and flatness on the surfaces can be maintained even after the core is surrounded by exterior covering 3 and an interior of the exterior covering is reduced in pressure and sealed. Therefore, adhesiveness at the time of mounting to refrigerating/cooling equipment is improved and the adiabatic effect is made further favorable.

The vacuum heat insulator 1 according to the sixth to eighth exemplary embodiments is lightweight, high in stiffness and planar accuracy because it contains therein a small quantity of binding agent, so one having a large area is usable.

Being varied depending upon type, application quantity, and addition of the binding agent, concentration of the water solution of the binding agent cannot be unconditionally prescribed but is desirably 0.5 to 20 wt % in view of solubility in water. An application quantity of a water-diluted solution of the binding agent is not specifically prescribed but is preferably at least half but at most 3 times the fibrous material in weight ratio. This is because with less than half, the water solution is hard to permeate inside the laminated fibers, and with more than 3 times, surplus water content in a liquid state outflows in the subsequent heating and compressing process, and the binding agent also outflows along therewith to cause loss in the binding agent.

Ninth Exemplary Embodiment

A vacuum heat insulator according to a ninth exemplary embodiment is the same in fundamental constitution as that of the sixth exemplary embodiment. In the vacuum heat insulator according to this embodiment, a cured layer is formed by spraying water on surfaces of a core.

A method of manufacturing a core according to this embodiment will be described below.

A raw stock of glass fibers manufactured by the centrifuge method and having an average fiber diameter of about 4 μm to 6 μm is cut to a predetermined size and aggregated in a predetermined amount to be laminated. Ion exchanged water around a neutrality of a PH value of at least 6 but at most 8 is sprayed onto surfaces of a fiber laminate in a manner to adhere evenly thereto. A sprayed quantity is made 1.5 to 2.0 times in a weight of the fiber laminate.

The fiber laminate onto which the ion exchanged water is sprayed is compressed at room temperature around 25° C. to make the water diffused and permeated inside the fiber laminate. The fiber laminate is subjected to high-temperature compression in a heating press to be held for 10 minutes or longer to be dried, thus fabricating molded body 5 having a thickness of 10 mm. In the high-temperature compression, the laminate is placed in a metallic jig heated to 380° C. and is pressed from above by a metallic presser plate.

The molded body thus obtained is hard to be split in a direction of lamination and made high in reliability because glass fibers are oriented perpendicular to a direction of heat transmission by repeated compression.

A molded body fabricated to have a thickness of 10 mm is cut to 180 mm×180 mm sized pieces to form core 2. Core 2 is dried in a drying furnace at 150° C. for about 60 minutes and water moisture remaining after molding is removed.

Dried core 2 is taken out from the drying furnace, an adsorbent is quickly received into recesses, which have been beforehand formed in core 2, and core 2 receiving therein the adsorbent is inserted into exterior covering 3 to be placed in a vacuum chamber. An interior of the vacuum chamber is reduced in pressure and exhausted to have a degree of vacuum of at most 1.33 Pa, in which state an opening of exterior covering 3 is thermally fused in the vacuum chamber to be sealed. Thus a vacuum heat insulator 1 is obtained.

A cured layer of core 2 thus structured is formed by simply spraying water on the surfaces of the laminate. That is, fibers are bound by that substance which is eluted from the fibers due to adhesion of water. The substance thus eluted from the fibers functions as a binding agent. With the method with water spraying, water does not completely permeate an inner layer and the inner layer becomes weak in binding strength, so that it is possible to obtain a core in which the inner a layer the softer the layer.

While ion exchanged water is used as water being sprayed onto the fiber laminate, it is not specifically limitative but distilled water, alkali ion water, mineral water, filtered pure water, or city water will also be used.

As characteristic values of water, hardness, total alkalinity, concentration of chlorine residue, concentrations of ions such as basic nitrogen e.g., nitrous acidic, nitric acidic, and ammoniacal nitrogen, phosphoric acid, copper, and iron are not specifically limitative. However, ion exchanged water is preferable in terms of adiabatic performance.

An adsorbent is received if desired and may not be used especially.

The thermal conductivity of vacuum heat insulator 1 obtained in this manner is measured at an average temperature 24° C. to be 0.0020 W/mK. In a test for reliability with passage of time corresponding to 10 years, a value of thermal conductivity is 0.025 W/mK and so deterioration is slight.

The density of core 2 is found by measuring weight and volume of vacuum heat insulator 1, unsealing exterior covering 3 of vacuum heat insulator 1, and measuring weight and volume of exterior covering 3 and the adsorbent to subtract the same from the values of vacuum heat insulator 1.

The density of core 2, according to this embodiment, thus found is 250 kg/m$^3$.

Tenth Exemplary Embodiment

Figure 6:
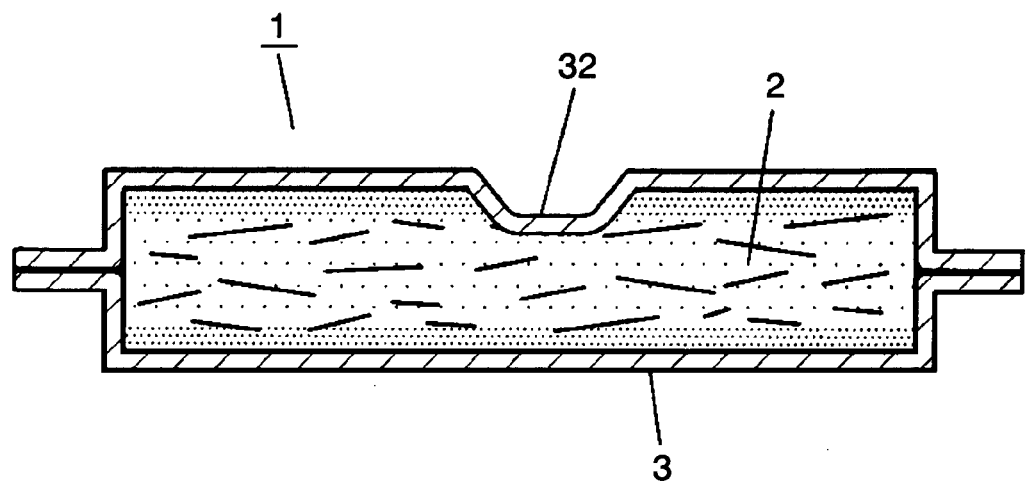
FIG. 6 is a cross sectional view of a vacuum heat insulator according to a tenth exemplary embodiment of the present invention.
Figure 7:
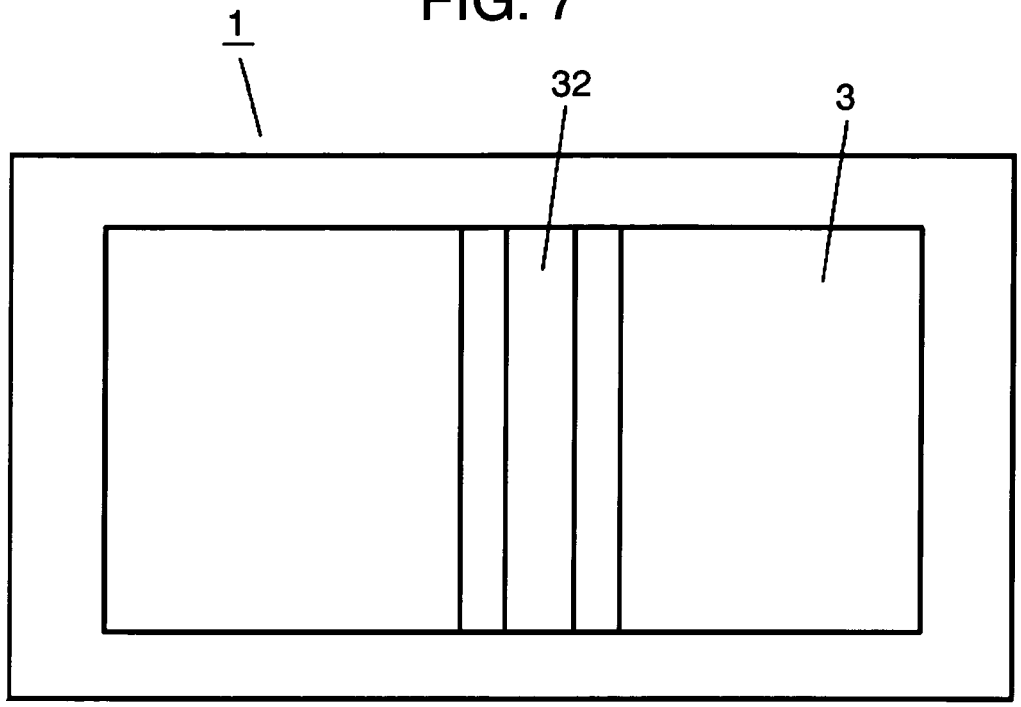
FIG. 7 is a plan view of the vacuum heat insulator according to the tenth exemplary embodiment of the present invention.

FIG. 6 is a cross sectional view of a vacuum heat insulator according to a tenth exemplary embodiment of the present invention. FIG. 7 is a plan view of the vacuum heat insulator according to the tenth exemplary embodiment of the present invention. Being the same in fundamental constitution and materials as those of the sixth to eighth exemplary embodiments, vacuum heat insulator 1 according to this embodiment is formed on a surface thereof with groove 32.

Subsequently, a method of manufacturing vacuum heat insulator 1 will be described.

First, a plate-shaped vacuum heat insulator is fabricated in the same manner as in the exemplary embodiment. The thermal conductivity of such vacuum heat insulator is 0.0023 W/mK at an average temperature 24° C.

Thereafter, the vacuum heat insulator is pressingly narrowed in press molding with the use of a molding die to be formed on a surface thereof with groove 32, dimensions of which are 50 mm at an opening, 20 mm at a bottom surface (straight portion), and 5 mm in depth. Corner portions of the molding die in pressure contact with exterior covering 3 assume a cylindrical shape.

Groove 32 thus formed suffers no damage such as pin holes or the like to the surface of exterior covering 3 and the thermal conductivity is not varied except groove 32.

In evaluating deterioration of the heat insulator through an accelerated test in order to ascertain reliability with passage of time, the thermal conductivity under conditions of passage of 10 years is 0.0055 W/mK at an average temperature 24° C., and there is no difference between the vacuum heat insulator and a vacuum heat insulator formed with no groove.

That is, since a binder in the inner layer of core 2 is small in concentration and the inner portion is soft, there is caused no problem in forming groove 32 by means of press molding after fabrication of the vacuum heat insulator. Groove 32 can be molded at a relatively small pressure of pressing in the atmosphere with the use of a common apparatus. Groove 32 is in some cases necessary to keep out of other constituent elements when an adiabatic box, to which vacuum heat insulator 1 is applied, is to be formed. Groove 32 is readily formed on vacuum heat insulator 1 according to the invention to lead to an improvement in productivity and reduction on cost.

Eleventh Exemplary Embodiment

Vacuum heat insulator 1 according to this embodiment is fabricated in the same manner as in the sixth to eighth exemplary embodiments after a groove is formed on a core fabricated in the sixth to eighth exemplary embodiments by means of cutting. In this stage, vacuum heat insulator 1 having been formed with groove 32 is resulted.

The thermal conductivity of vacuum heat insulator 1 is the same as that in the exemplary embodiment and the thermal conductivity under conditions of passage of 10 years also has no difference therebetween.

That is, since a binder in the inner layer of the core is small in concentration and the inner portion is soft, the groove is readily formed on the molded body and there is no fear of damage to the exterior covering possibly caused by a molding die.

The groove may be formed by that molding die, which is used in heating and compressing molded body 4.

With respect to the tenth and eleventh exemplary embodiments, an explanation is given to the vacuum heat insulator making use of a core on surfaces of which a binding agent is large in quantity and which is formed with a cured layer. However, like the sixth to eighth exemplary embodiments, it suffices that a soft layer having a small quantity of binding agent is present somewhere in a through-thickness direction of a core. An explanation for other materials or the like is the same as in the sixth to eighth exemplary embodiments.

Twelfth Exemplary Embodiment

A vacuum heat insulator according to a twelfth exemplary embodiment is the same in fundamental constitution and materials as those of the ninth exemplary embodiment. A groove is formed on a surface of such vacuum heat insulator. While the method is the same as that in the tenth exemplary embodiment, a molded body obtained in case of using water is softer than that in case of using a binder, and damage to a exterior covering is small.

Thirteenth Exemplary Embodiment

A vacuum heat insulator according to a thirteenth exemplary embodiment is the same in fundamental cross sectional structure as that of the first exemplary embodiment shown in FIG. 1. Core 2 is different in constitution from that in the first exemplary embodiment.

Core 2 is a plate-shaped molded body composed of a glass wool board formed by hot pressure forming in a dry process by means of a binding agent. Core 2 contains fibers having short fiber lengths. Table 2 indicates results of structuring vacuum heat insulator 1 by the use of core samples A to D having different fiber lengths and different ratios of content of fibers and evaluating them in terms of thermal conductivity. Compressibility indicated in Table 2 is found from a ration of that thickness of care 2 after structuring of a vacuum heat insulator which is found from a thickness of vacuum heat insulator 1, and a thickness of core 2 prior to structuring of the vacuum heat insulator.

Figure 8:
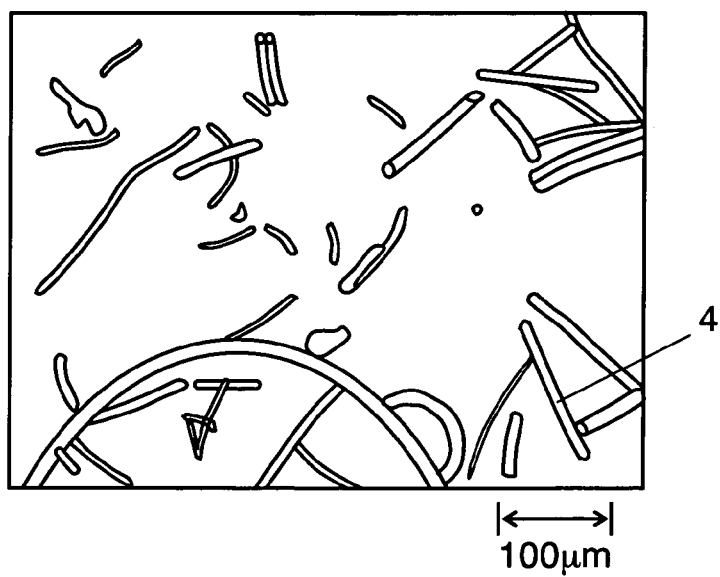
FIG. 8 is an exemplary, conceptual view showing an appearance of a surface of a core, observed with an optical microscope, according to a thirteenth exemplary embodiment of the present invention.

FIG. 8 shows a state in which vacuum heat insulator 1 making use of the sample C is unsealed and core 2 is taken out for observation. In the state shown in FIG. 8, an optical microscope is used under the condition of standard temperature and pressure to make observation in photographic magnification of 200 (objective lens magnification; ×50). As shown in the figure, fibers are oriented perpendicular to a direction of heat transmission. Table 2 indicates results of measuring fiber lengths of total fibers present in a range of observation and counting the number of fibers assuming that fibers beyond the range have a fiber length of at least 100 μm.

TABLE 2

|  |  | A | B | C | D |
|---|---|---|---|---|---|
| Thermal conductivity (W/mK) | | 0.0025 | 0.0025 | 0.0025 | 0.0050 |
| Density (kg/m³) | | 300 | 270 | 500 | 250 |
| Compressibility (%) | | 15 | 10 | 40 | |
| Fiber length | 10 μm or smaller | 6 | 2 | 4 | 0 |
| | to 20 μm | 11 | 3 | 8 | 2 |
| | to 30 μm | 11 | 5 | 7 | 2 |
| | to 40 μm | 8 | 4 | 7 | 6 |
| | to 50 μm | 1 | 3 | 2 | 1 |
| | to 60 μm | 3 | 5 | 6 | 5 |
| | to 70 μm | 1 | 1 | 2 | 2 |
| | to 80 μm | 3 | 1 | 3 | 4 |
| | to 90 μm | 1 | 2 | 3 | 0 |
| | to 100 μm | 0 | 4 | 2 | 1 |
| | Larger than 100 μm | 67 | 28 | 19 | 68 |
| Number of fibers of 100 μm or smaller | | 45 | 30 | 44 | 33 |
| Number of fibers of larger than 100 μm | | 67 | 28 | 19 | 68 |
| Ratio (%) of fibers of 100 μm or smaller | | 40 | 52 | 70 | 25 |

Table 2 also indicates results of adjusting data and calculating the number of fibers having a fiber length of 100 μm or smaller.

As apparent from Table 2, heat transmission by fibers is interrupted by inclusion of short fibers, when fibers having a fiber length of 100 μm or smaller are included in the range of 40% or more. Therefore, vacuum heat insulator 1 possesses a low initial thermal conductivity. That is, the vacuum heat insulator is excellent in adiabatic performance. In the case where fibers having a fiber length of 100 μm or smaller are included in the range of less than 40% as in the sample D, heat transmission through fibers is much so the vacuum heat insulator provide a high thermal conductivity.

In the case where the content of fibers having a fiber length of 100 μm or smaller exceeds 70%, short fibers oriented in a direction of heat transmission increase to cause an increase in solid heat transmission, thus lowering the adiabatic performance.

As described in the first exemplary embodiment, a getter substance such as a gas adsorbent, a moisture adsorbent, etc. may be incorporated into vacuum heat insulator 1.

While various organic and inorganic materials described in the first to fifth exemplary embodiments are applicable to fibrous materials and a bonding agent used for core 2, inorganic materials are desirable for the both materials from the viewpoint of reliability over a long term.

Fourteenth Exemplary Embodiment

Figure 9:
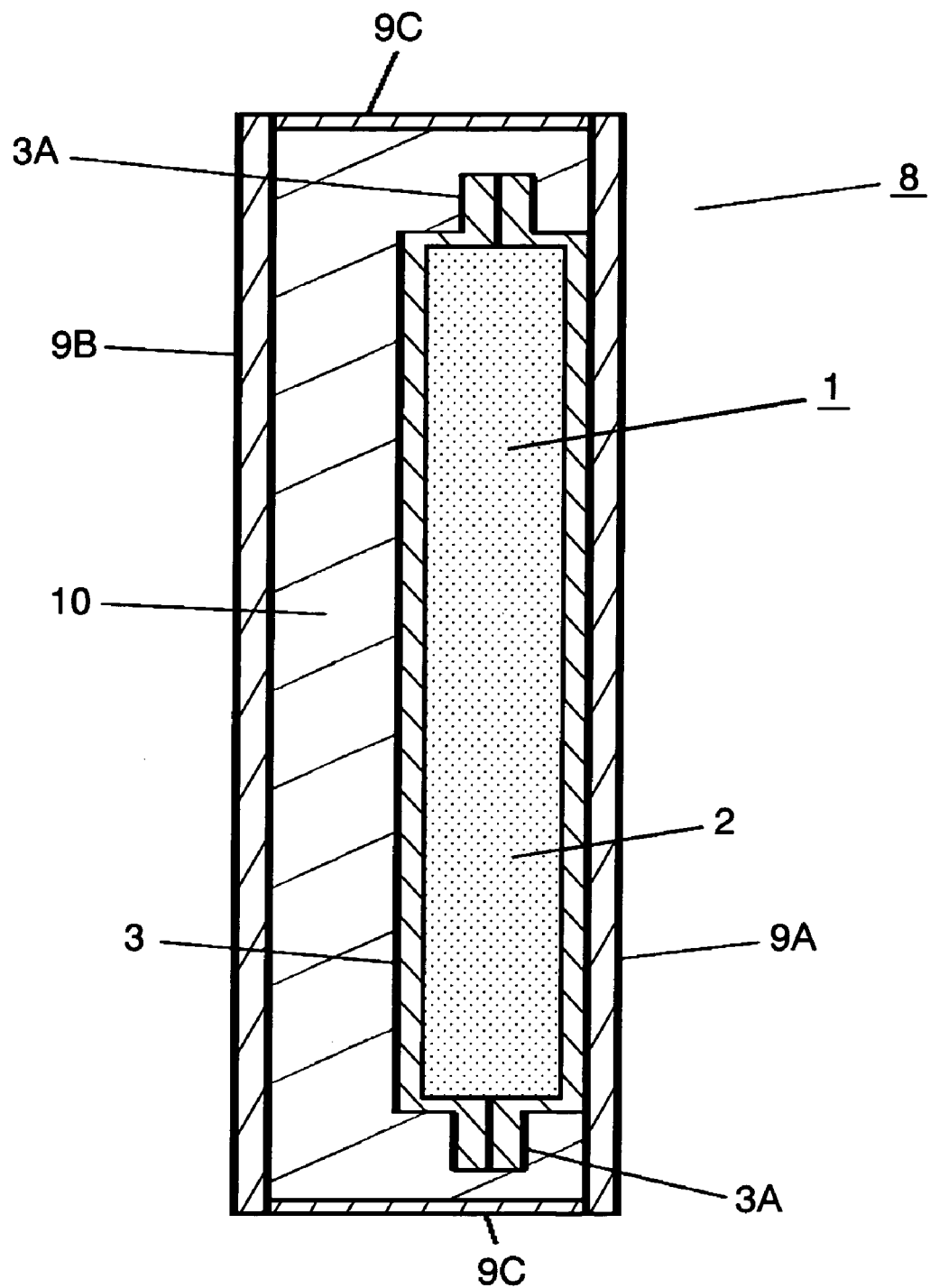
FIG. 9 is a cross sectional view of a heat insulating element according to a fourteenth exemplary embodiment of the present invention.

FIG. 9 is a cross sectional view of an adiabatic element according to a fourteenth exemplary embodiment of the present invention. Adiabatic element 8 according to this embodiment includes vacuum heat insulator 1 according to any one of the first to ninth exemplary embodiments. Alternatively, the vacuum heat insulator according to the thirteenth exemplary embodiment may be used. Vacuum heat insulator 1 is arranged in a space enclosed by plate elements 9A, 9B as an exterior covering and frame 9C connecting outer peripheries of plate elements 9A, 9B together in such a manner that one flat surface of vacuum heat insulator 1 contacts closely with plate element 9A. Foamy heat insulator 10 as a heat insulator other than the vacuum heat insulator is filled in a space except vacuum heat insulator 1. Vacuum heat insulator 1 and adiabatic element 8 are in the form of a plate. Foamy heat insulator 10 is, for example, rigid urethane foam. It may be phenol foam, styrene foam, etc.

Plate elements 9A, 9B and frame 9C are made of metals and rigid resins, and all of them may be made of the same material, or one of plate elements 9A, 9B may be made of metal and the other may be made of a resin. Frame 9C may be formed integral with plate element 9A or plate element 9B.

According to this embodiment, only one flat surface of vacuum heat insulator 1 is made in close contact with plate element 9A but the other flat surface of vacuum heat insulator 1 may also be made in close contact with plate element 9B. Desirably, that surface of plate element 9A or 9B, which is made in close contact with the flat surface of vacuum heat insulator 1, is high in flatness.

In place of foamy heat insulator 10, polystyrene foam may be used as a heat insulator other than the vacuum heat insulator.

According to this embodiment, plate elements 9A, 9B, frame 9C, and foamy heat insulator 10 protect vacuum heat insulator 1 from damage caused by external forces and maintain a low pressure state inside vacuum heat insulator 1. Therefore, the adiabatic performance of vacuum heat insulator 1 is maintained over a long term, and hence the adiabatic performance of adiabatic element 8 is maintained over a long term. Since fillet-shaped fused portions 3A of exterior covering 3 of vacuum heat insulator 1 are hidden, protected, and fixed, handling becomes easy to enlarge a range in which vacuum heat insulator 1 is applied. Since vacuum heat insulator 1 has a high adiabatic performance and the core has a great mechanical strength, it is possible to decrease a thickness of vacuum heat insulator 1 and hence a thickness of adiabatic element 8.

According to this embodiment, foamy heat insulator 10 is filled in that portion of the space enclosed by plate elements 9A, 9B and frame 9C serving as an exterior covering, which is not occupied by vacuum heat insulator 1. Thereby, it is easy to fill a space between the exterior coverings and vacuum heat insulator 1 with foamy heat insulator 10 owing to flowability thereof at the time of filling. Thin vacuum heat insulator 1 is usable also in case of arranging foamy heat insulator 10 between one surface of vacuum heat insulator 1 and the exterior covering. Therefore, a gap for filling of foamy heat insulator 10 is ensured between one surface of vacuum heat insulator 1 and plate element 9A to such an extent that flowability (filling quality) of foamy heat insulator 10 is not hindered, whereby adiabatic element 8 having an excellent adiabatic property is provided.

A foaming agent used in foaming foamy heat insulator 10 such as rigid urethane foam is not specifically limitative. From the viewpoint of protection of the ozone layer and prevention of global warming, the foaming agent desirably includes cyclopentane, isopentane, n-pentane, isobutane, n-butane, water (foaming of carbon dioxide), azo compounds, argon, etc. In particular, cyclopentane is desirable in terms of adiabatic performance.

Fifteenth Exemplary Embodiment

Figure 10:
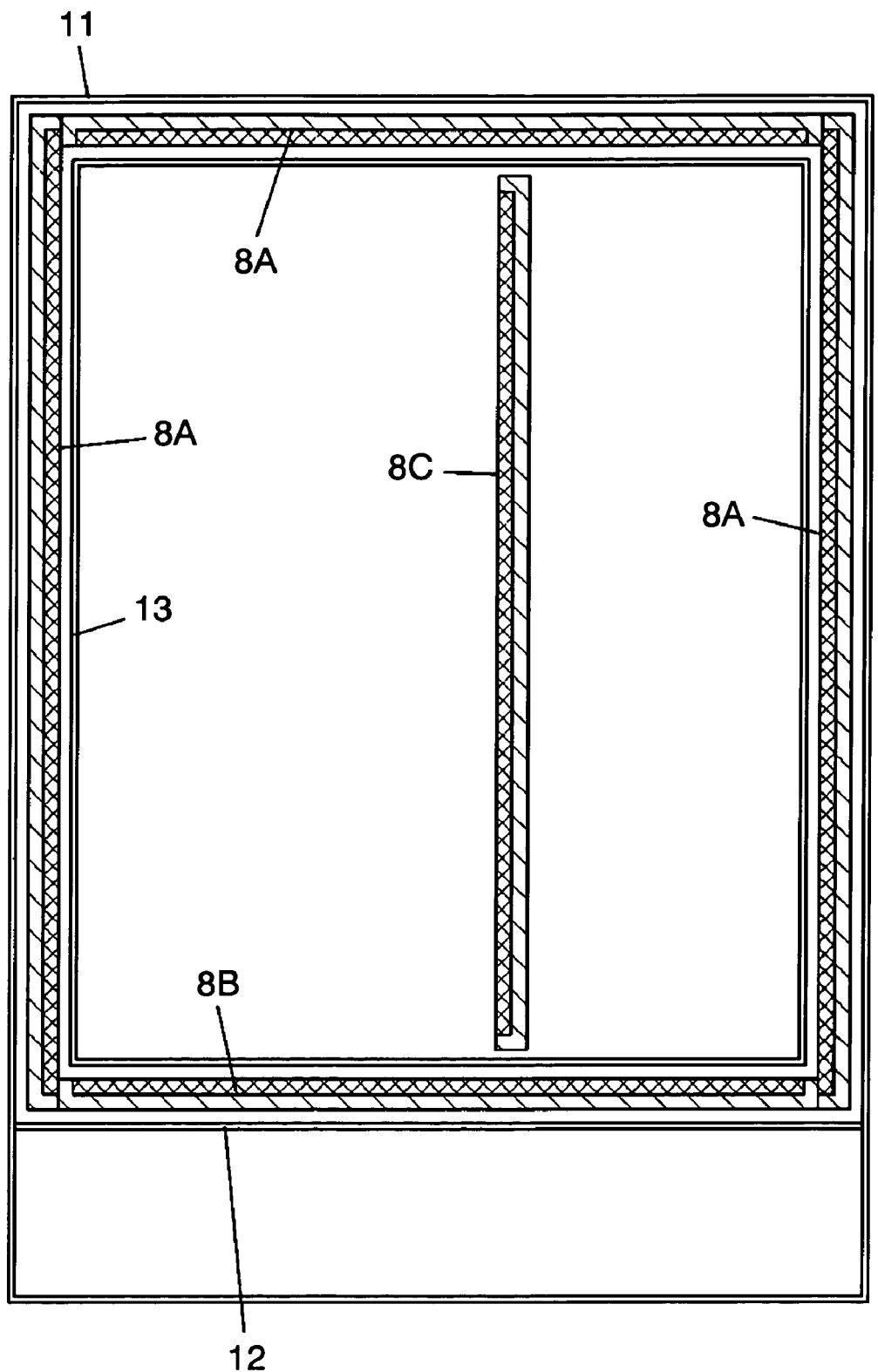
FIG. 10 is a cross sectional view of a storage shed according to a fifteenth exemplary embodiment of the invention.

FIG. 10 is a cross sectional view of a storage shed according to a fifteenth exemplary embodiment of the present invention.

The storage shed according to this embodiment has outer box 11, partition plate 12, inner box 13, and adiabatic element 8. Outer box 11 defines an outer shell of the storage shed itself. Partition plate 12 compartments an interior of outer box 11 into an upper storage room and a lower machine room. Inner box 13 is arranged apart from inner surfaces of outer box 11 and an upper surface of partition plate 12 with predetermined spaces, and inner box 13 defines inner wall surfaces of the storage room. All outer box 11, partition plate 12, and inner box 13 are made of metal or a rigid resin. Adiabatic elements 8A, 8B are arranged as heat insulating plates between outer box 11 and inner box 13 and between partition plate 12 and inner box 13. Adiabatic element 8C serves as an adiabatic partition to compartment the storage room into two rooms of different temperatures. Adiabatic elements 8A to 8C are the same in structure as adiabatic element 8 in the fourteenth exemplary embodiment.

Since exterior coverings of adiabatic elements 8A, 8B are protected by outer box 11, partition plate 12, and inner box 13, they may be relatively weak in mechanical strength. On the other hand, an exterior covering of adiabatic element 8C is preferably made of a metal having a relatively high mechanical strength so as to eliminate the need of providing a protective member for surface protection.

With the storage shed according to this embodiment, adiabatic elements 8 according to the fourteenth embodiment are combined to form adiabatic walls for heat insulation of an interior of the storage shed. Thereby, there is provided a storage shed, in which the adiabatic walls are high in mechanical strength and excellent in adiabatic property. Alternatively, the adiabatic walls are decreased in thickness to provide a storage shed increased in inner volume or decreased in outside dimensions.

With the storage shed according to this embodiment, adiabatic elements 8 according to the fourteenth exemplary embodiment serve as an adiabatic partition plate to compartment the interior of the storage shed into a plurality of rooms at different temperatures. Thereby, a quantity of heat transmitted between the rooms compartmented by adiabatic element 8C is decreased. Alternatively, adiabatic element 8C is decreased in thickness to increase inner volumes of the storage rooms. Alternatively, the storage shed is decreased in outside dimensions.

The storage shed according to this embodiment is applicable to automatic vending machines and cold showcases. While adiabatic element 8C shown in FIG. 10 divides the storage room laterally into two sections, the storage room may be divided into two or more sections, or divided vertically.

Sixteenth Exemplary Embodiment

Figure 11:
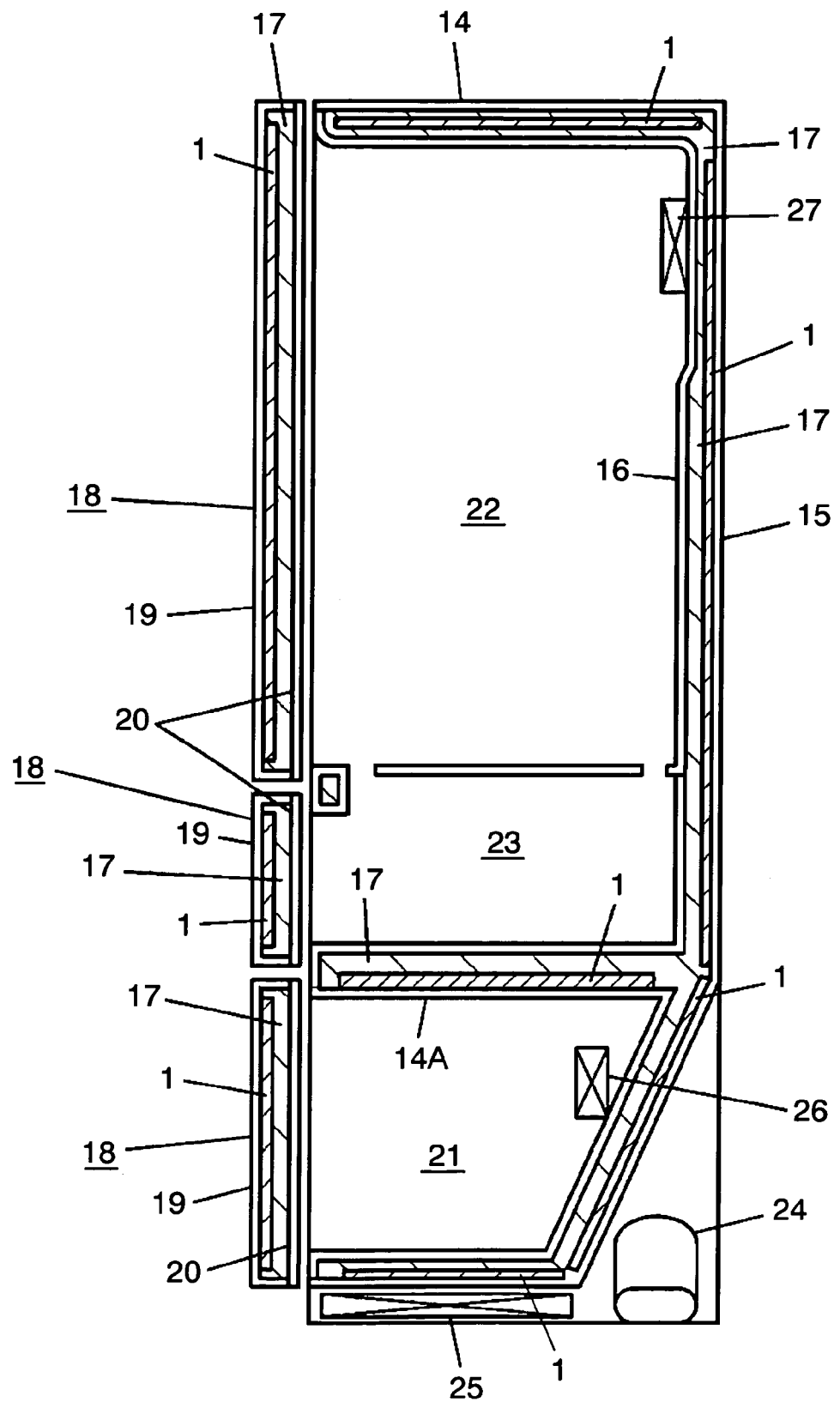
FIG. 11 is a cross sectional view of a refrigerator according to a sixteenth exemplary embodiment of the present invention.

FIG. 11 is a cross sectional view of an adiabatic box, adiabatic doors, a storage shed, and a refrigerator composed of them, according to a sixteenth exemplary embodiment of the present invention.

Adiabatic box 14 according to this embodiment has vacuum heat insulator 1 according to any one of the first to ninth and thirteenth exemplary embodiments. Vacuum heat insulators 1 are arranged in a space surrounded by outer box 15 and inner box 16 as exterior coverings. Each one of surfaces of vacuum heat insulators 1 is arranged in a manner to contact closely with outer box 15 or inner box 16 which defines a bottom surface of adiabatic partition wall 14A. Outer box 15 and inner box 16 are made of metal or synthetic resins. Vacuum heat insulators 1 are plate-shaped. Foamy heat insulator 17 other than the vacuum heat insulator is filled in a space except vacuum heat insulators 1. As similar to foamy heat insulator 10 according to the fourteenth exemplary embodiment, foamy heat insulator 17 is made of, for example, rigid urethane foam. Thus adiabatic box 14 is of dual-layered structure to include vacuum heat insulators 1 and foamy heat insulator 17, and in the form of a box.

In manufacture of adiabatic box 14, vacuum heat insulators 1 are beforehand bonded and fixed to outer box 15, and inner box 16 which defines the bottom surface of adiabatic partition wall 14A, and a raw material of foamy heat insulator 17 is injected to be foamed integrally.

Vacuum heat insulators 1 are arranged substantially evenly on respective surfaces, that is, both side surfaces, a roof surface, a back surface, and a bottom surface of adiabatic box 14 to occupy 80% of a surface area of outer box 15.

With adiabatic box 14 according to this embodiment, outer box 15, inner box 16, and foamy heat insulator 10 protect vacuum heat insulators 1 from damage due to external forces. Accordingly, a low pressure state inside vacuum heat insulators 1 is kept, so that the adiabatic performance of vacuum heat insulators 1 is maintained over a long term. Therefore, the adiabatic performance of adiabatic box 14 is maintained over a long term. Since vacuum heat insulators 1 are high in adiabatic performance and cores thereof are high in mechanical strength, vacuum heat insulators 1 can be made small in thickness and hence walls defining adiabatic box 14 become small in thickness.

With adiabatic box 14 according to this embodiment, foamy heat insulator 17 is filled in the space except vacuum heat insulators 1. Therefore, it is easy to fill a space between exterior coverings and vacuum heat insulators 1 with foamy heat insulator 17 owing to flowability thereof at the time of filling. Thin vacuum heat insulator 1 is usable also in case of arranging foamy heat insulator 17 between one surface of vacuum heat insulator 1 and the exterior covering. Therefore, a gap for filling of foamy heat insulator 17 can be ensured between one surface of vacuum heat insulator 1 and outer box 15, or inner box 16 which defines the bottom surface of adiabatic partition wall 14A, to such an extent that flowability (filling quality) of foamy heat insulator 17 is not hindered. Thus adiabatic box 14 having an excellent adiabatic property is provided.

When adiabatic box 14 is structured to have the same thickness as that in the conventional one, adiabatic box 14 is superior in adiabatic property to that in the conventional one and, in the case where adiabatic box 14 is made the same in adiabatic property as that in the conventional one, walls defining adiabatic box 14 are decreased in thickness as compared with that in the conventional one.

Adiabatic box 14 according to this embodiment is structured integral with adiabatic partition wall 14A. However, adiabatic partition wall 14A may be made separately in the form of a plate like the adiabatic element according to the fourteenth exemplary embodiment and incorporated into adiabatic box 14.

Each of adiabatic doors 18 according to this embodiment has vacuum heat insulator 1 according to any one of the first to ninth and thirteenth exemplary embodiments. Vacuum heat insulator 1 is arranged in a space surrounded by outside surface plate 19 and inside surface plate 20 as exterior coverings. Outside surface plate 19 and inside surface plate 20 are made of metal or synthetic resins. One surface of vacuum heat insulator 1 is arranged in a manner to contact closely with outside surface plate 19. Foamy heat insulator 17 other than the vacuum heat insulator is filled in a space except vacuum heat insulator 1. Each of adiabatic door 18 is of dual-layered structure composed of vacuum heat insulator 1 and foamy heat insulator 17, and plate-shaped to close a front opening of adiabatic box 14 in an openable and closable manner.

In manufacture of adiabatic door 18, vacuum heat insulator 1 is beforehand bonded and fixed to the outside surface plate 19, and a raw material of foamy heat insulator 17 is injected to be foamed integrally.

With adiabatic door 18 according to this embodiment, outside surface plate 19, inside surface plate 20, and foamy heat insulator 17 protect vacuum heat insulator 1 from damage due to external forces. Foamy heat insulator 17 is filled in a space except vacuum heat insulator 1. Thus in the same manner as with the adiabatic box described above, a thin vacuum heat insulator having an excellent adiabatic property, which is maintained over a long term, is obtained and adiabatic doors 18 having the same properties are provided.

The storage shed according to this embodiment includes adiabatic box 14, adiabatic doors 18, and the storage rooms formed in a space surrounded by adiabatic box 14 and adiabatic doors 18. Vacuum heat insulators 1 are used for both adiabatic box 14 and adiabatic doors 18 to enhance the adiabatic property of adiabatic box 14 and adiabatic doors 18. With such construction, the storage room is increased in inner volume by making adiabatic box 14 and adiabatic door 18 small in thickness. Alternatively, the storage room is decreased in outside dimensions.

The refrigerator according to this embodiment has adiabatic box 14, adiabatic doors 18, the storage rooms, and a cooling device. The storage rooms are formed in a space surrounded by adiabatic box 14 and adiabatic doors 18 to include freezing room 21 at −15° C. to −25° C. in a lower stage, cold storage room 22 at 0° C. to 10° C. in an upper stage, and vegetable room 23 at 0° C. to 10° C. in a middle stage. The cooling device cools freezing room 21, cold storage room 22, and vegetable room 23. The cooling device includes compressor 24, condenser 25, freezing room cooler (referred below to as cooler) 26, and cold storage room cooler (referred below to as cooler) 27. Compressor 24 is arranged on a back surface side of a machine room formed at a bottom of adiabatic box 14. Condenser 25 is positioned below freezing room 21 within the machine room. Cooler 26 is arranged on a back surface of freezing room 21. Cooler 27 is arranged on a back surface of cold storage room 22. Adiabatic partition wall 14A is arranged between freezing room 21 and cold storage room 22, which are different in storage temperature from each other. Adiabatic partition wall 14A may be provided with a notch (not shown), in which a damper (not shown) is mounted so that cooler 26 acts to cool cold storage room 22 and vegetable room 23 without the provision of cooler 27.

Refrigerant used in the cooling device may be Freon 134a, isobutane, n-butane, propane, ammonia, carbon dioxide, and water, and is not specifically limitative.

The refrigerator according to this embodiment has vacuum heat insulator 1 described in the first to ninth and thirteenth exemplary embodiments. The refrigerator thus constructed is made highly adiabatic because of a sharply excellent adiabatic performance relative to that of conventional foamy heat insulators. Accordingly, compressor 24 serving to cool an interior of the storage shed countering invasion of heat from outside is sharply reduced in operation time. That is, the cooling device serving to cool the cold storage rooms (freezing room 21, cold storage room 22, and vegetable room 23) to predetermined temperatures is reduced in operational energy to contribute to energy saving. Alternatively, with the refrigerator thus constructed, the cold storage room can be increased in inner volume or reduced in outside dimensions.

Adiabatic box 14 and adiabatic doors 18 according to this embodiment are of dual-layered structure composed of vacuum heat insulators 1 and foamy heat insulator 17. Thereby, in addition to the effect of vacuum heat insulator 1 according to any one of the first to ninth and thirteenth exemplary embodiments, the vacuum heat insulators are combined with foamy heat insulator 17 in adiabatic box 14 to thereby achieve an increase of the box in strength. Therefore, even when vacuum heat insulators 1 are positioned between outer box 15 and inner box 16 and between outside surface plate 19 and inside surface plate 20, between which foamy heat insulator 17 is filled, distortion and indentation are not generated on outer box 15, inner box 16, and outside surface plate 19. Accordingly, the adiabatic box and the adiabatic door are provided to be excellent in adiabatic performance.

Seventeenth Exemplary Embodiment

A cross sectional view of a refrigerator according to a seventeenth exemplary embodiment of the present invention is the same as FIG. 11 showing the sixteenth exemplary embodiment.

According to this embodiment, vacuum heat insulator 1 described in the sixth to eighth exemplary embodiments is used. Vacuum heat insulator 1 is arranged on outer box 15 inside the box such that a surface thereof on that side, on which a cured layer of core 2 is formed, faces an inner surface of outer box 15.

An amount of electric power consumption of the refrigerator thus constructed is decreased 25% relative to that of a refrigerator provided with no vacuum heat insulator.

A freezing equipment, and a cooling equipment, that is, a refrigerator, which is excellent in adiabatic performance, is obtained by arranging the vacuum heat insulators, which is excellent in adiabatic performance, according to the sixth to eighth exemplary embodiments, in a space defined by the outer box and the inner box and filling foamy heat insulator in a space except the vacuum heat insulators. Since the cured layer is formed on the surface of core 2, stiffness of the core is high. Thereby, a refrigerator of energy saving and excellent outward appearance is obtained, in which the outward appearance (planar accuracy) of outer box 15 and the adiabatic performance of the adiabatic box can be made higher-dimensionally compatible.

Eighteenth Exemplary Embodiment

A cross sectional view of a refrigerator according to an eighteenth exemplary embodiment of the present invention is the same as FIG. 11 in the sixteenth exemplary embodiment. According to this embodiment, the vacuum heat insulator described in the tenth to twelfth exemplary embodiments is used.

Figure 12:
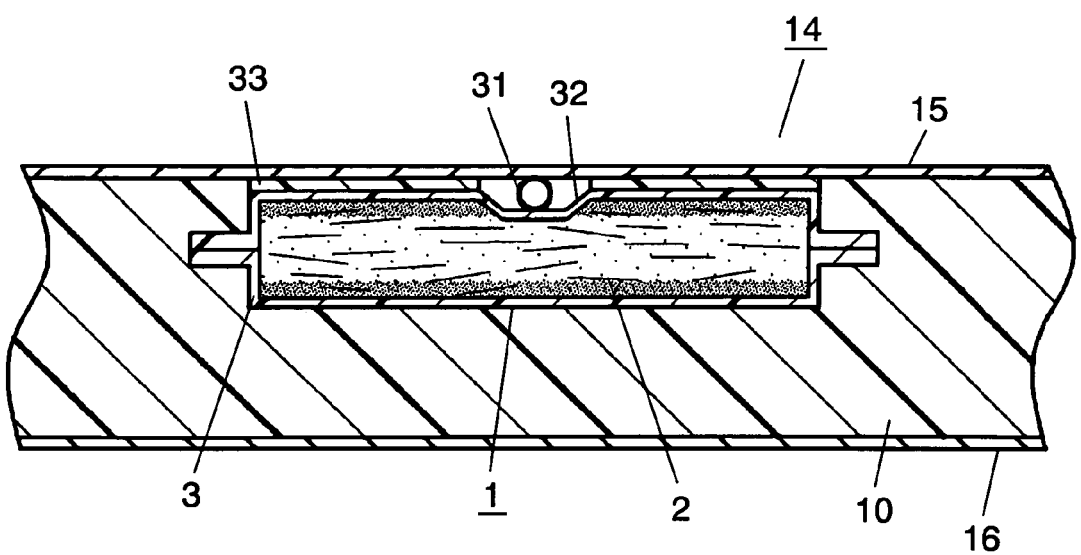
FIG. 12 is an enlarged, cross sectional view of an essential part of a roof surface of a refrigerator-freezer according to an eighteenth exemplary embodiment of the present invention.

FIG. 12 is an enlarged, cross sectional view of an essential part of a roof surface of a refrigerator according to this embodiment.

Preferably, vacuum heat insulator 1 formed with groove 32 capable of receiving therein refrigerant pipe 31 is arranged on that portion of an inner surface of outer box 15, where refrigerant pipe 31 is arranged, such that refrigerant pipe 31 is received in the groove 32. Vacuum heat insulator 1 thus formed with groove 32 is described with respect to the tenth to twelfth exemplary embodiments. Generally, a plurality of small vacuum heat insulators are arranged on that portion of the inner surface of outer box 15, on which refrigerant pipe 31 is arranged, keeping away from the refrigerant pipe 31. On the other hand, according to this embodiment, large vacuum heat insulator 1 can be arranged in a manner to cover refrigerant pipe 31. Therefore, a refrigerator excellent in energy saving can be obtained, in which a small number of vacuum heat insulators 1 makes it possible to efficiently prevent heat of outer box 15 and the refrigerant pipe 31 from being transmitted to an interior of the refrigerator.

Vacuum heat insulator 1 is fixed to outer box 15 by means of thermoplastic, gelled, hot melt adhesive (referred below to as adhesive) 33. A layer of adhesive 33 has a thickness of about 100 µm. The thickness preferably ranges from 70 to 130 µm. Adhesive 33 is coated evenly on a surface of vacuum heat insulator 1 in proper quantities by means of a roller or the like. The surface is to be bonded to outer box 15. The provision of a layer of adhesive 33 having a thickness over 130 µm leads to waste of the adhesive and reduction in adiabatic performance because adhesive 33 transmits heat more easily than the foamy heat insulator. When the layer of adhesive 33 is less than 70 µm in thickness, reliability in adhesion is lowered. While a two-sided tape can be used in place of adhesive 33 for fixation, a hot melt adhesive is preferable in terms of reliability in adhesion. A type of hot melt adhesive is not specifically limitative and there are listed ones, of which a base includes ethylene-vinyl acetate copolymer resin, polyamide resin, polyester resin, synthetic rubber, etc.

Adhesive 33 may be used for fixation of vacuum heat insulator 1 in the sixteenth and seventeenth exemplary embodiments.

According to this embodiment, refrigerant pipe 31 is received in groove 32. In the case where a portion, on which vacuum heat insulator 1 is arranged, is not planar, however, groove 32 may be provided in a manner to receive projections.

While an effect is produced when the vacuum heat insulator is applied to a location in the refrigerator according to the sixteenth to eighteenth exemplary embodiments, where is large in temperature difference between outside and inside the refrigerator, the coverage of 50% or more relative to a surface area of the outer box is desirable. When the coverage is over 50%, influences due to heat loss in rigid urethane foam are decreased and insulation effectiveness owing to application of the vacuum heat insulator becomes dominant, so that efficient heat insulation becomes possible.

It is preferable to use inorganic fibers for a core of the vacuum heat insulator. Since inorganic fibers are nonflammable, the refrigerator is enhanced in safety.

The refrigerator according to this embodiments is shown as a typical example of equipments, which operate in the temperature zone of −30° C. to room temperature, at which heat insulation is required. This vacuum heat insulator is also usable in, for example, insulated vans, refrigerators making use of thermoelectric refrigeration, etc. Cold equipments, such as automatic vending machines, making use of cold and warmth in a range up to high temperatures come within the category of the present invention. Gas equipments, or equipments such as cooler boxes, etc., requiring no power are also included.

Further, the vacuum heat insulator is also usable in personal computers, jar pots, rice cookers, etc.

INDUSTRIAL APPLICABILITY

The vacuum heat insulator according to the present invention includes a core molded to be plate-shaped with the use of a binding agent. The vacuum heat insulator assumes any one of the following configurations.

A) The core is formed by curing a fiber aggregate by means of a binding agent. The fibers have an average fiber diameter of at least 0.1 µm but at most 10 µm, and voids defined by fibers have a void diameter of at most 40 µm. The core has a percentage of the voids of at least 80%.

B) A binding agent is varied in concentration in a through-thickness direction of the core.

C) A cured layer solidified by the binding agent is formed on at least one side surface of the core.

D) The core contains fibers having a length of at most 100 µm. The fibers are oriented perpendicular to a direction of heat transmission.

Such vacuum heat insulator is excellent in adiabatic performance. Adiabatic elements, adiabatic doors, adiabatic boxes, storage sheds, and refrigerators, in which such vacuum heat insulator and a foamy heat insulator are used, have an excellent adiabatic property, and maintain the adiabatic property over a long term, so that they can be made thin and small in size. Alternatively, it is possible to increase an inner volume. The refrigerators are excellent in adiabatic property to contribute to energy saving.

LIST OF REFERENCE NUMERALS IN THE DRAWINGS

1: vacuum heat insulator
2: core
2A: skin layers
2B: intermediate layers
2C: central layer
3: exterior covering
4, 4A, 4B: molded body
5: binding agent
6: fiber
8, 8A, 8B, 8C: adiabatic element
9A, 9B: plate element
9C: frame
10, 17: foamy heat insulator
11, 15: outer box
12: partition plate
13, 16: inner box
14: adiabatic box
14A: adiabatic partition wall
18: adiabatic door
19: outside surface plate
20: inside surface plate
21: freezing room
22: cold storage room
23: vegetable room
24: compressor
25: condenser
26: freezing-room cooler
27: cold storage room cooler
31: refrigerant pipe
32: groove
33: adhesive

The invention claimed is:

1. A vacuum heat insulator comprising:
a molded plate-shaped core having an aggregate comprising fibers and a binding agent for curing the fiber aggregate, and
an exterior cover enclosing the core in a chamber defined by the exterior cover, the chamber having a pressure lower than a pressure outside the chamber,
wherein the fibers have an average fiber diameter between 0.1 μm and 10 μm,
voids defined by the fibers have a void diameter of at most 40 μm,
the core comprises at least 90% said voids defined by the fibers, and
a difference in thickness of the core between when the core is subjected to the pressure outside the chamber and when the core is subjected to the pressure inside the chamber is at most 10%.

2. A vacuum heat insulator, comprising:
a core comprising a plate-shaped molded body containing fibers and a binding agent, the concentration of the binding agent being larger at a surface of the core than inside the core in a through-thickness direction thereof, thereby decreasing a solid thermal conductivity of the core, decreasing resistance to exhaustion, and ensuring a strength of the vacuum heat insulator; and
an exterior cover enclosing the core in a chamber defined by the exterior cover, an interior of the chamber having a lower pressure than an exterior of the chamber, the exterior cover having a groove that extrudes toward a center of the core.

3. The vacuum heat insulator according to claim 1, wherein the binding agent contains at least an organic binder.

4. The vacuum heat insulator according to claim 1, wherein the binding agent contains at least an inorganic binder.

5. The vacuum heat insulator according to claim 1, wherein the binding agent contains at least a thermosetting binder.

6. The vacuum heat insulator according to claim 1, wherein the binding agent contains at least one of boric acid, borate, phosphoric acid, phosphate, and a heated product thereof.

7. The vacuum heat insulator according to claim 1, wherein the core has a density of between at least 100 kg/m$^3$ and not more than 400 kg/m$^3$.

8. The vacuum heat insulator according to claim 1, wherein the fibers are made of an inorganic material.

9. The vacuum heat insulator according to claim 1, wherein the fibers contain at least one of glass wool and glass fibers.

10. The vacuum heat insulator according to claim 1, wherein the fibers constitute a nonwoven web.

11. The vacuum heat insulator according to claim 1, wherein the core includes a laminate.

12. The vacuum heat insulator according to claim 1, having a thermal conductivity of between at least 0.0015 W/mK and not more than 0.0025 W/mK.

13. A method of manufacturing a vacuum heat insulator according to claim 1, the method comprising steps of:
A) covering the core with the exterior cover,
B) reducing the pressure within the chamber so that the core is decreased in thickness by, at most, 10%, and
C) sealing an opening of the exterior cover.

14. The method of manufacturing a vacuum heat insulator, according to claim 13, wherein the fibers are made of an inorganic material.

15. A heat insulating element comprising:
the vacuum heat insulator according to claim 1,
a second heat insulator other than the vacuum heat insulator, and
a second exterior cover,
wherein the vacuum heat insulator and the second heat insulator are located within the second exterior cover, and
the second heat insulator occupies space within the second exterior cover that is not occupied by the vacuum heat insulator.

16. The heat insulating element according to claim 15, wherein the second heat insulator is a foamy heat insulator.

17. An adiabatic box, wherein the heat insulating element according to claim 15 is formed to be box-shaped.

18. An adiabatic door comprising the heat insulating element according to claim 15.

19. A storage shed comprising:
the adiabatic box according to claim 17, and
an adiabatic door to cover an opening of the adiabatic box.

20. A storage shed comprising:
the heat insulating element according to claim 15, and
an adiabatic wall for thermal insulation of an interior of the storage shed.

21. A storage shed having an adiabatic partition plate including the heat insulating element according to claim 15, wherein an interior of the storage shed is compartmented into a plurality of rooms.

22. A refrigerator comprising:
the storage shed according to claim 19, and
a cooling device to cool a storage room in the storage shed.

23. The adiabatic box according to claim 17, wherein the core of the vacuum heat insulator has a cured layer on at least one side surface thereof, said cured layer being solidified by a binding agent; and
a surface of the vacuum heat insulator on a side of the cured layer faces an inner surface of the second exterior cover.

24. The refrigerator according to claim 22, wherein the binding agent has a higher concentration on a surface of the core than inside the core in a through-thickness direction thereof, and
said exterior cover has a groove extending from an outer surface of the exterior cover toward a center of the core, said groove for receiving a projection on a surface on which the vacuum heat insulator is located.

25. The refrigerator according to claim 24,
wherein the cooling device includes a refrigerant pipe and the projection is the refrigerant pipe.

26. The refrigerator according to claim 22, further comprising an adhesive to fix the vacuum heat insulator to the second exterior cover.

27. The refrigerator according to claim 26, wherein the adhesive is a hot-melt adhesive.

28. The refrigerator according to claim 26, wherein the adhesive has a thickness of between at least 70 μm and not more than 130 μm.

29. A method of manufacturing a refrigerator, the method comprising:
a) manufacturing a vacuum heat insulator by the method according to claim 13,
b) enclosing the vacuum heat insulator and a second heat insulator that is not the vacuum heat insulator within a second exterior cover to form a heat insulating element,
c) forming a storage shed from at least one of adiabatic boxes, adiabatic doors, and adiabatic walls by using the heat insulating element, and
d) mounting a cooling device that cools an interior of the storage shed.

30. A refrigerator comprising:
the storage shed according to claim 20, and
a cooling device to cool a storage room in the storage shed.

31. A refrigerator comprising:
the storage shed according to claim 21, and
a cooling device to cool a storage room in the storage shed.

32. The refrigerator according to claim 22, wherein the core of the vacuum heat insulator has a cured layer on at least one side surface thereof, said cured layer being solidified by a binding agent; and
said exterior cover comprises a groove extending from an exterior surface of the exterior cover toward a center of the core.

* * * * *